US010374699B2

(12) United States Patent
Ji et al.

(10) Patent No.: US 10,374,699 B2
(45) Date of Patent: Aug. 6, 2019

(54) PHOTONIC INTEGRATED CIRCUIT AND OPTICAL TRANSMITTER

(71) Applicant: SAMSUNG ELECTRONICS CO., LTD., Suwon-si, Gyeonggi-do (KR)

(72) Inventors: Ho-Chul Ji, Suwon-si (KR); Keun Yeong Cho, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/889,449

(22) Filed: Feb. 6, 2018

(65) Prior Publication Data
US 2019/0013870 A1 Jan. 10, 2019

(30) Foreign Application Priority Data

Jul. 6, 2017 (KR) .................. 10-2017-0086114

(51) Int. Cl.
H04Q 11/00 (2006.01)
H04B 10/032 (2013.01)

(52) U.S. Cl.
CPC .......... H04B 10/032 (2013.01); H04Q 11/00 (2013.01); H04Q 11/0062 (2013.01); H04Q 2011/0081 (2013.01)

(58) Field of Classification Search
CPC ........ H04B 10/03–038; H04B 10/2587; H04B 10/50–588; H04J 14/0287–0297
See application file for complete search history.

(56) References Cited

U.S. PATENT DOCUMENTS

| 5,299,293 | A | * | 3/1994 | Mestdagh | ............ | H04B 10/032 370/221 |
| 5,568,575 | A | | 10/1996 | Sato | | |
| 6,324,318 | B1 | * | 11/2001 | Suzuki | ............... | H04J 14/0221 385/1 |
| 7,212,738 | B1 | * | 5/2007 | Wang | .................. | H04B 10/032 398/17 |
| 7,447,446 | B2 | | 11/2008 | Aoki et al. | | |
| 7,831,151 | B2 | | 11/2010 | Trezza | | |
| 8,559,815 | B2 | | 10/2013 | Lizuka et al. | | |
| 8,761,553 | B2 | | 6/2014 | Park et al. | | |
| 9,083,459 | B2 | | 7/2015 | Oda et al. | | |
| 9,164,300 | B2 | | 10/2015 | Bernasconi et al. | | |
| 9,285,539 | B2 | | 3/2016 | Zheng et al. | | |

(Continued)

FOREIGN PATENT DOCUMENTS

JP 2005-065173 A 3/2005

Primary Examiner — Casey L Kretzer
(74) Attorney, Agent, or Firm — Lee & Morse, P.C.

(57) ABSTRACT

A photonic integrated circuit includes a main light source, a redundant light source, a controller, an optical switch, and a modulator. The main light source outputs main light through a main light input waveguide. The redundant light source outputs redundant light through a redundant light transmission waveguide. The controller generates a first switch signal based on a fault state of the main light source. The optical switch selectively provides the redundant light from the redundant light transmission waveguide to a redundant light input waveguide based on the first switch signal. The modulator modulates main light from the main light input waveguide or redundant light from the redundant light input waveguide and outputs a first optical signal.

20 Claims, 18 Drawing Sheets

(56) References Cited

U.S. PATENT DOCUMENTS

| | | |
|---|---|---|
| 9,325,422 B2 | 4/2016 | Nagarajan |
| 9,684,127 B2 | 6/2017 | Qi et al. |
| 9,705,630 B2 | 7/2017 | Liboiron-Ladouceur et al. |
| 2011/0170821 A1* | 7/2011 | Lipson .................... G02F 1/025 385/8 |
| 2013/0308942 A1* | 11/2013 | Ji .......................... H04B 10/25 398/45 |
| 2015/0381277 A1* | 12/2015 | Shimizu ............... H04B 10/572 398/34 |
| 2016/0315698 A1* | 10/2016 | Zhou ................... H04J 14/0295 |
| 2016/0381442 A1 | 12/2016 | Heanue et al. |

* cited by examiner

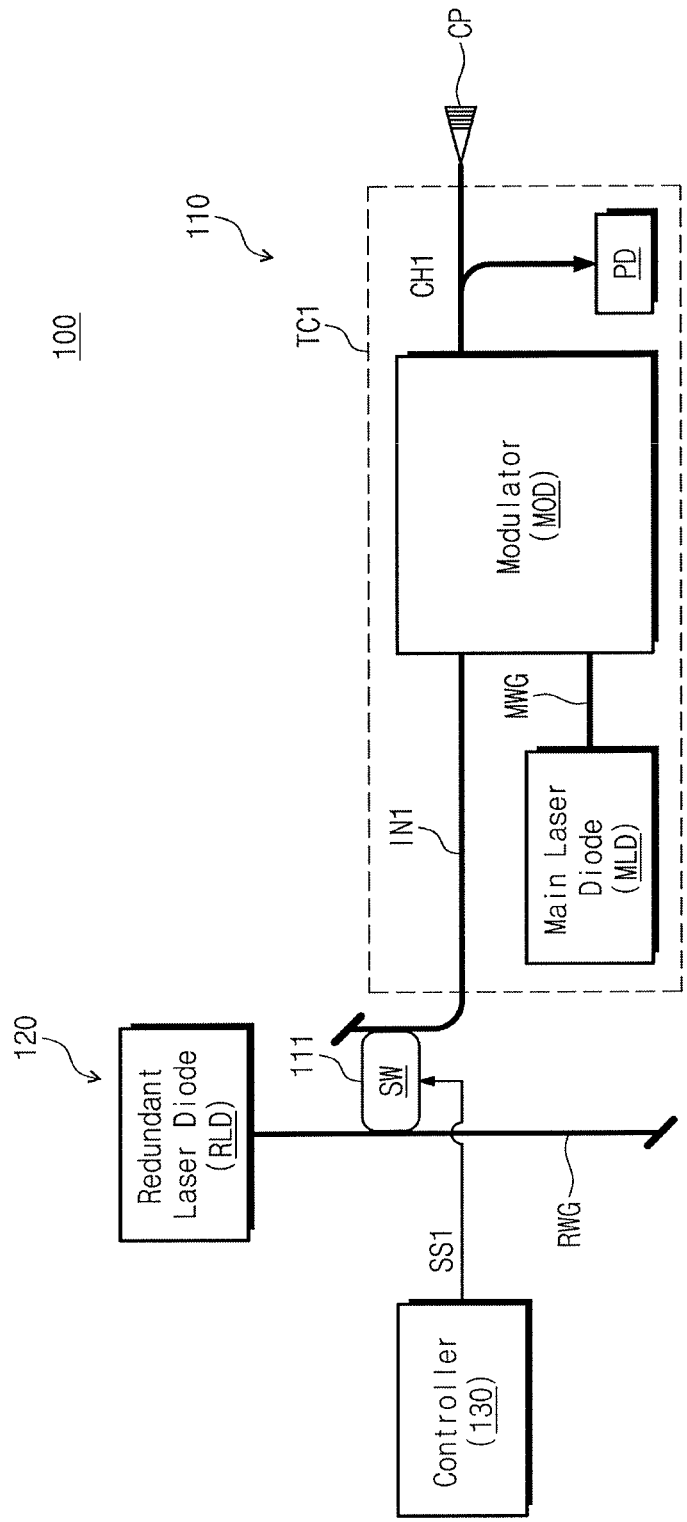

PHOTONIC INTEGRATED CIRCUIT AND OPTICAL TRANSMITTER

CROSS-REFERENCE TO RELATED APPLICATIONS

Korean Patent Application No. 10-2017-0086114 filed on Jul. 6, 2017, and entitled: "Photonic Integrated Circuit and Optical Transmitter," is incorporated by reference herein in its entirety.

BACKGROUND

1. Field

One or more embodiments described herein relate to a photonic integrated circuit and an optical transmitter.

2. Description of the Related Art

A photonic integrated circuit performs various functions based on optical signals. Many of these functions are similar to those performed by an electronic integrated circuit. However, a photonic integrated circuit may outperform an electronic integrated circuit in some ways. For example, an electronic integrated circuit exchanges electrical signals through a conductive line such as a copper wire. The conductive line may limit the ability of the signals to be transmitted at high speed. A photonic integrated circuit does not transmit signals through a conductive line. Thus, it may be possible to transmit optical signals at higher speeds than electrical signals.

Also, a photonic integrated circuit uses various optical sources (e.g., laser diode, light emitting diode, etc.) and other elements to transmit optical signals. When these sources and elements malfunction (e.g., include defects that arise during manufacturing or driving), performance is adversely affected.

SUMMARY

In accordance with one or more embodiments, a photonic integrated circuit includes a first main light source to output a first main light through a first main light input waveguide; a first redundant light source to output a first redundant light through a first redundant light transmission waveguide; a controller to generate a first switch signal based on a fault state of the first main light source; a first optical switch connected between the first redundant light transmission waveguide and a first redundant light input waveguide, the first optical switch to selectively provide the first redundant light from the first redundant light transmission waveguide to the first redundant light input waveguide based on the first switch signal; and a first modulator connected with the first main light input waveguide and the first redundant light input waveguide, the first modulator to modulate the first main light from the first main light input waveguide or the first redundant light from the first redundant light input waveguide and to output a first optical signal.

In accordance with one or more other embodiments, a photonic integrated circuit includes a first redundant light source to output a first redundant light; a plurality of optical transmission cells to respectively generate a plurality of main lights and to respectively modulate the plurality of generated main lights to output a plurality of optical signals; a plurality of optical switches to selectively provide the first redundant light to each of the plurality of optical transmission cells based on a plurality of switch signals, respectively; and a controller to generate the plurality of switch signals based on fault states of the plurality of optical transmission cells, respectively.

In accordance with one or more other embodiments, an optical transmitter includes a first modulator to output a first optical signal; a first main light source connected with the first modulator through a first main light input waveguide, the first optical transmitter to output a first main light through the first main light input waveguide; and a first optical switch connected with the first modulator through a first redundant light input waveguide, the first optical switch to selectively provide a first redundant light from the outside to the first redundant light input waveguide depending on a fault state of the first main light source, wherein the first modulator is to modulate the first main light to output the first optical signal and wherein, when the first main light source is faulty, the first modulator is to modulate the first redundant light from the first redundant light input waveguide to output the first optical signal.

BRIEF DESCRIPTION OF THE DRAWINGS

Features will become apparent to those of skill in the art by describing in detail exemplary embodiments with reference to the attached drawings in which:

FIG. 3 illustrates another embodiment of a photonic integrated circuit;

DETAILED DESCRIPTION

Figure 1:
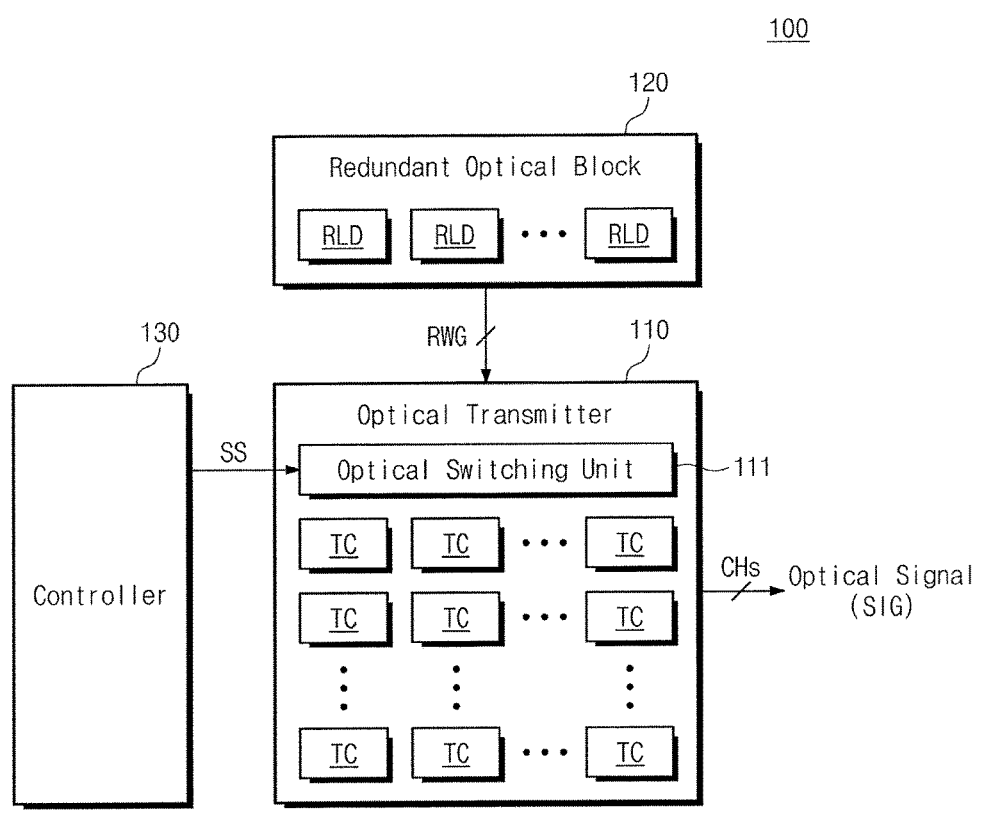
FIG. 1 illustrates an embodiment of a photonic integrated circuit.

FIG. 1 illustrates an embodiment of a photonic integrated circuit (PIC) 100 which may include an optical transmitter 110, a redundant optical block 120, and a controller 130. The photonic integrated circuit 100 may be a processor, a MODEM, an interface, a system-on-chip (SoC), various devices using optical communication or optical signal processing, or a combination thereof. In one embodiment, the photonic integrated circuit 100 may be included in the above-described components and may be used to perform optical communication or optical signal processing.

The optical transmitter 110 may include a plurality of transmitter cells TC and an optical switching unit 111. Each of the plurality of transmitter cells TC may modulate light from a main light source to generate an optical signal SIG including data, and may output the generated optical signal SIG through a plurality of channels CHs.

The optical switching unit 111 may include a plurality of wavelength selective optical switches. Each of the plurality of wavelength selective optical switches may operate based on a switch signal SS from the controller 130, such that redundant light provided through a redundant waveguide (or a redundant optical transmission waveguide) RWG is used in a transmitter cell TC that is faulty. In accordance with at least one embodiment, each of the optical switches may be a wavelength selective optical switch or various optical elements for changing the path of an optical signal.

When a specific transmitter cell among the plurality of transmitter cells TC is faulty (e.g., when a main light source in the specific transmitter cell does not operate normally), an optical switch connected with the faulty transmitter cell among the plurality of transmitter cells may be enabled based on the switch signal SS. In this case, redundant light provided through a redundant waveguide (among the plurality of redundant waveguides RWG) connected with the enabled optical switch may be provided to the faulty transmitter cell. The faulty transmitter cell may generate and output the optical signal SIG using the redundant light through the enabled optical switch. (An operation for providing redundant light to the faulty transmitter cell may be referred to as a restoration operation, e.g., a restoration operation for a main light source or a restoration operation for a transmitter cell.)

The redundant optical block 120 may be connected with the optical transmitter 110 through a redundant waveguide RWG. The redundant optical block 120 may include a plurality of redundant laser diodes RLD (for a brief description, below, referred to as a "redundant light source").

Each of the plurality of redundant light sources RLD may provide redundant light to the optical transmitter 110 through the redundant waveguide RWG. In an embodiment, the redundant light provided through the redundant waveguide RWG may be used to restore a fault, defect, or other trouble associated with a main light source included in each of the plurality of transmitter cells TC. For example, each of the plurality of transmitter cells TC of the optical transmitter 110 may include a main light source for generating a light. When a main light source of each of the transmitter cells TC is unusable, or otherwise impaired, due to various factors occurring in a manufacturing process or driving, at least one of redundant lights provided through the redundant waveguide RWG may be used instead of the unusable main light source. For example, each of the redundant light sources RLD may be used to restore a fault, defect, or other trouble of a main light source in each of the transmitter cells TC.

In an embodiment, the number of redundant light sources RLD may be less than the number of transmitter cells TC. For example, one of the redundant light sources RLD may be connected with at least two or more of the transmitter cells TC and may be used to restore a fault of each of the at least two or more transmitter cells TC.

The controller 130 may perform overall operations of the photonic integrated circuit 100. In an embodiment, to control the optical switching unit 111 in the optical transmitter 110, the controller 130 may provide the switch signal SS to the optical switching unit 111. The controller 130 may control the transmitter cells TC of the optical transmitter 110 and the redundant light sources RLD of the redundant optical block 120 independently.

In one embodiment as illustrated in FIG. 1, the optical transmitter 110 includes the transmitter cells TC and the optical switching unit 111, and the redundant optical block 120 and the controller 130 are separate devices. The optical transmitter 110, the redundant optical block 120, and the controller 130 may be integrated in one semiconductor chip, one semiconductor package, or one semiconductor module. In one embodiment, one or more of the optical transmitter 110, the redundant optical block 120, and the controller 130 may be implemented in a separate semiconductor die, a separate semiconductor chip, a separate semiconductor package, or a separate semiconductor module.

Figure 2A:
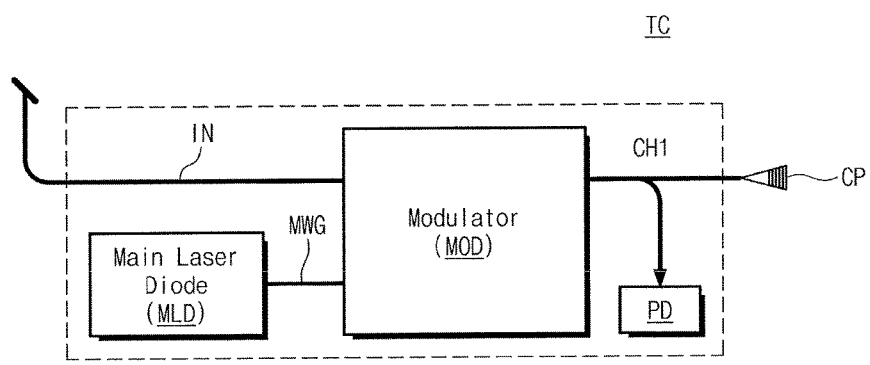
FIG. 2A illustrates an embodiment of a transmitter cell.
Figure 2B:
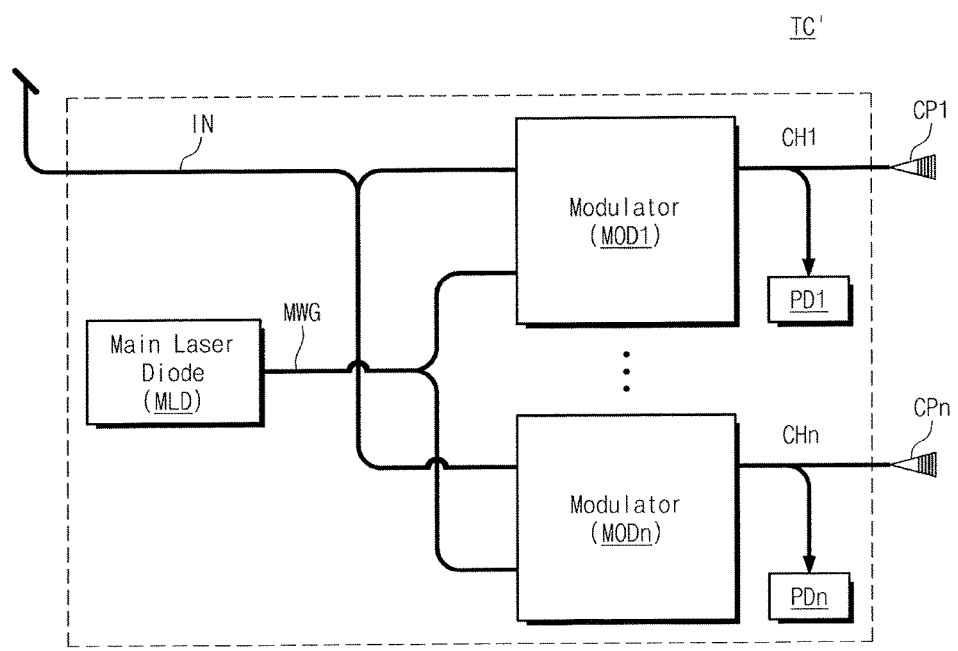
FIG. 2B illustrates another embodiment of a transmitter cell.

FIG. 2A illustrates an embodiment of the transmitter cell TC of FIG. 1, and FIG. 2B illustrates another embodiment of the transmitter cell TC of FIG. 1. In FIGS. 2A and B, for illustrative purposes, an optical waveguide through which light is transmitted is marked by a bold solid line. In one embodiment, the optical waveguide may be replaced with various media for transmitting optical signals.

Each of function blocks (e.g., a main light source and a modulator) is illustrated as being directly connected with a waveguide. In one embodiment, each function block and a waveguide may be connected to each other through various connection elements (e.g., an input optical coupler and an output optical coupler). In one embodiment, one or more of the connection elements may not be a structure, circuit, etc., having a specific function but simply may be for connecting an optical waveguide and a function device.

In an embodiment, the transmitter cell TC for outputting the optical signal SIG to one channel CH1 is described with reference to FIG. 2A. A transmitter cell TC' outputting the optical signal SIG to a plurality of channels CH1 to CHn is described with reference to FIG. 2B.

Referring to FIG. 2A, the transmitter cell TC includes a main laser diode (MLD) (e.g., main light source), a modulator MOD, and a photo detector PD. The main light source MLD may output light of a specific wavelength through a main waveguide MWG (or a main light input waveguide). In an embodiment, the main light source MLD may be a laser diode. In another embodiment, the main light source MLD may include a different light emitting element e.g., a light-emitting diode (LED). The main light source MLD may be directly connected with the modulator MOD through the main waveguide MWG.

The modulator MOD may be connected with the main waveguide MWG and an input waveguide IN. The input waveguide IN (or the redundant light input waveguide) may be an optical waveguide for receiving a redundant light described with reference to FIG. 1. In an embodiment, the modulator MOD may be connected with the main waveguide MWG and the input waveguide IN through an optical coupler. In this case, the optical coupler may be simply for connecting a waveguide and a specific device and may not include an additional function.

The modulator MOD may modulate any one of a main light provided through the main waveguide MWG or a redundant light provided from the input waveguide IN, to output the optical signal SIG through the first channel CH. In an embodiment, the input waveguide IN may be a path for receiving a redundant light. In an embodiment, the modulator MOD may operate under control the controller 130 of FIG. 1 or a separate modulation driver circuit. In an embodiment, the optical signal SIG output through the first channel CH1 may be provided to an external device through an external optical transmission line or an optical fiber coupled with an optical coupler CP.

The photo detector PD may detect the optical signal SIG provided through the first channel CH1. In an embodiment, when the photo detector PD fails to detect the optical signal SIG based on the main light source MLD, it may be determined that the main light source MLD is faulty. In an embodiment, the optical signal (SIG) detection result of the photo detector PD may be provided to the controller 130 of FIG. 1, and the controller 130 may generate the switch signal SS based on the detection result.

Referring to FIG. 2B, the transmitter cell TC' may include the main light source MLD, a plurality of modulators MOD1 to MODn, and a plurality of photo detectors PD1 to PDn. The main light source MLD may be directly connected with the modulators MOD1 to MODn through the main waveguide MWG.

Each of the modulators MOD1 to MODn may be connected with the main waveguide MWG and the input waveguide IN. Each of the modulators MOD1 to MODn may modulate one of main light provided through the main waveguide MWG or redundant light provided from the input waveguide IN, to output the optical signal SIG through the corresponding one of the channels CH1 to CHn. In an embodiment, each of the modulators MOD1 to MODn may operate under control the controller 130 of FIG. 1 or a separate modulation driver circuit. In an embodiment, the optical signals SIG output through the first to n-th channels CH1 to CHn may be provided to an external device through external optical transmission lines or optical fibers coupled with first to n-th optical couplers CP1 to CPn.

FIG. 3 illustrates an embodiment of a photonic integrated circuit, which, for example, may correspond to the photonic integrated circuit 100 in FIG. 1. For illustrative purposes, the photonic integrated circuit 100 will be discussed as having one redundant light source RLD and one transmitter cell TC1. The first transmitter cell TC1 of FIG. 3 may be the same as the transmitter cell TC of FIG. 2A, but the first transmitter cell TC1 may be replaced with the transmitter cell TC' of FIG. 2B or any other optical transmitter device.

Referring to FIGS. 1 and 3, the photonic integrated circuit 100 may include the first transmitter cell TC1, an optical switch SW, the redundant light source RLD, and the controller 130. In an embodiment, the first transmitter cell TC1 may be in the optical transmitter 110 of FIG. 1. The optical switch SW may be in the optical switching unit 111 of FIG. 1. The redundant light source RLD may be in the redundant optical block 120 of FIG. 1. The arrangement and features described above may be different in another embodiment.

The first transmitter cell TC1 may include the main light source MLD, the modulator MOD, and the photo detector PD. The first transmitter cell TC1 is similar to the transmitter cell TC described with reference to FIG. 2A.

The redundant light source RLD may provide a redundant light through the redundant waveguide RWG. The optical switch SW is between the redundant waveguide RWG and the first input waveguide IN1 and is connected or coupled with the redundant waveguide RWG and the first input waveguide IN1. In an embodiment, as described above, the optical switch SW may be a wavelength selective optical switch. The optical switch SW may operate to selectively provide a redundant light transmitted through the redundant waveguide RWG to the first input waveguide IN1 based on a first switch signal SS1 from the controller 130.

When the optical switch SW is disabled based on the first switch signal SS1, the optical switch SW may allow redundant light from the redundant light source RLD to be transmitted along the redundant waveguide RWG. When the optical switch SW is enabled based on the first switch signal SS1, the optical switch SW may allow the redundant light from the redundant light source RLD to be transmitted along the first input waveguide IN1. For example, the optical switch SW may selectively change a transmission path of the redundant light provided through the redundant waveguide RWG based on the first switch signal SS1.

Figure 4A:
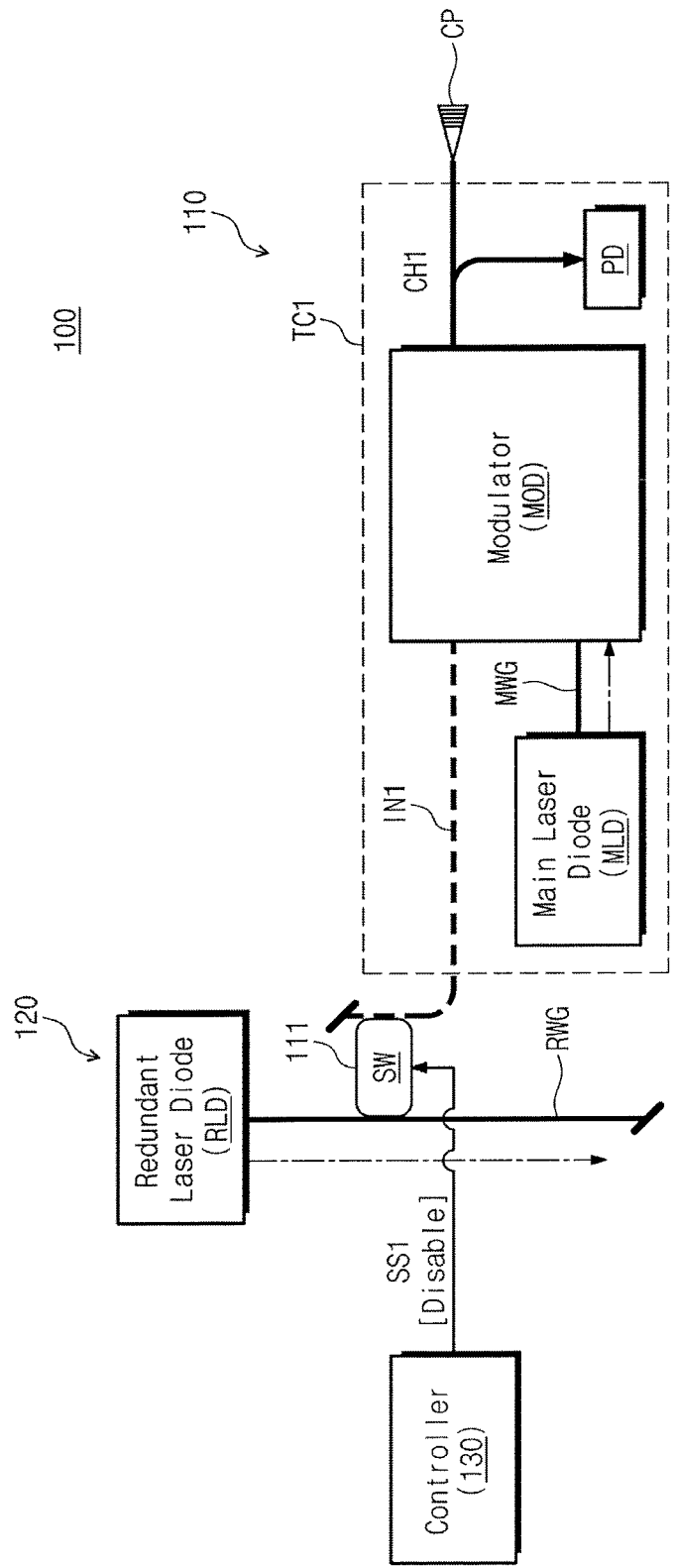
FIGS. 4A and 4B illustrate an embodiment of a light source restoration operation of the photonic integrated circuit.
Figure 4B:
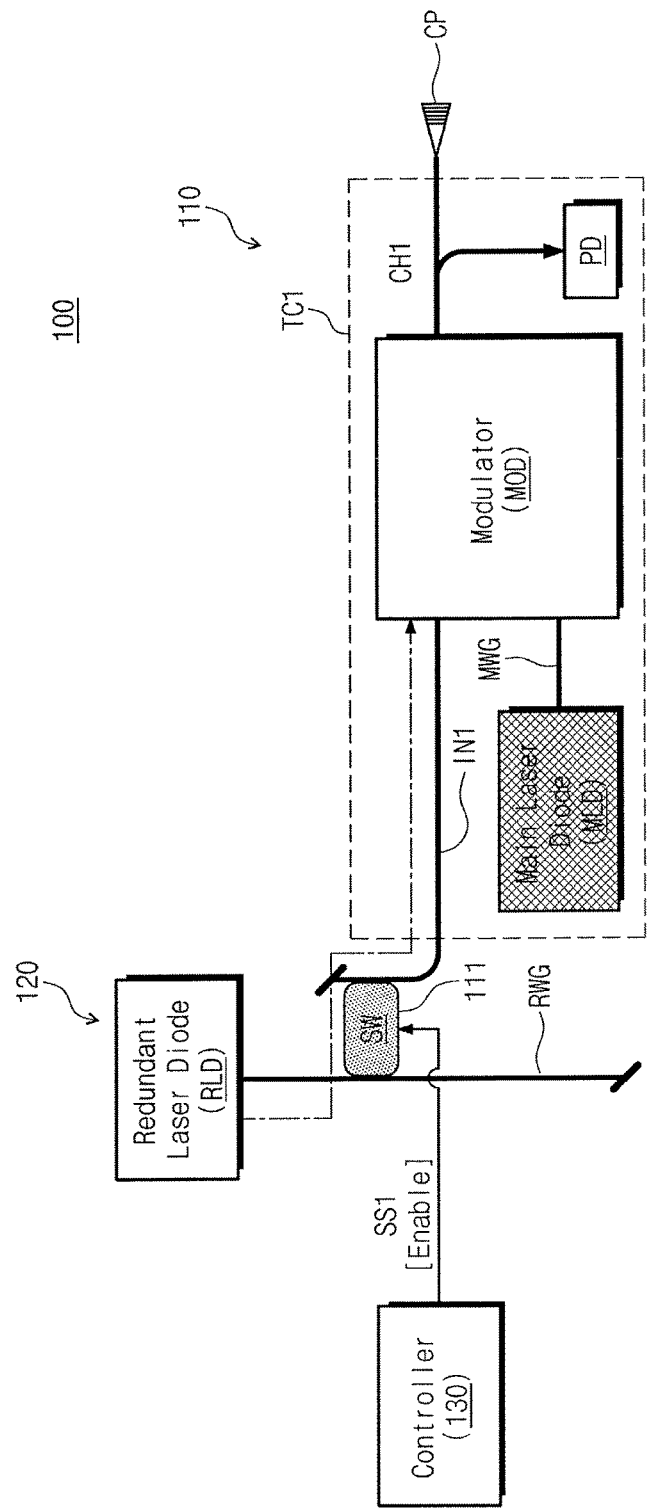

FIGS. 4A and 4B illustrate an embodiment of a light source restoration operation of the photonic integrated circuit 100. FIG. 4A illustrates operation of the photonic integrated circuit 100 when the main light source MLD is in a normal state. FIG. 4B illustrates operation of the photonic integrated circuit 100 when the main light source MLD is faulty.

In an embodiment, the situation the first switch signal SS1 being enabled or disabled may mean that a signal level for controlling the corresponding optical switch SW is set such that the corresponding optical switch SW changes or does not change a path of a redundant light. Also, the optical switch SW being enabled or disabled may mean that the optical switch SW operates to change or not to change a path of a redundant light.

First, referring to FIG. 4A, when the main light source MLD operates normally, the modulator MOD may modulate main light from the main light source MLD to generate the optical signal SIG that is to be output to the first channel CH1. In this case, the photo detector PD may detect the optical signal SIG through the first channel CH1.

When the optical signal SIG is detected normally by the photo detector PD, the controller 130 may disable the first switch signal SS1. The optical switch SW may operate based on the first switch signal SS1 disabled, such that redundant light from the redundant waveguide RWG is not provided to the first input waveguide IN1. In this case, redundant light from the redundant light source RLD may move along the redundant waveguide RWG. In this case, since light provided along the first input waveguide IN1 does not exist, the first input waveguide IN1 is illustrated by a dotted line in FIG. 4A.

Referring to FIG. 4B, when the main light source MLD does not operate normally (e.g., when the main light source MLD is in a fault state), the photo detector PD may fail to normally detect the optical signal SIG through the first channel CH1. In this case, the controller 130 may enable the first switch signal SS1 based on a feedback from the photo detector PD. For example, the controller 130 may determine a fault state of the main light source MLD based on the feedback from the photo detector PD. Based on the first switch signal SS1 being enabled, the optical switch SW may allow redundant light from the redundant waveguide RWG to be provided to the first input waveguide IN1.

For example, the optical switch SW may change a transmission path of the redundant light based on the first switch signal SS1 enabled. In this case, the redundant light may be provided to the modulator MOD through the redundant waveguide RWG, the optical switch SW, and the first input waveguide IN1. The modulator MOD may modulate the redundant light provided through the first input waveguide IN 1 to generate the optical signal SIG. In an embodiment, when the main light source MLD is in a fault state, the main light source MLD may not operate under control of the controller 130. In an embodiment, when redundant light is provided to the modulator MOD, power of the main light source MLD may be interrupted to remove a noise from the fault main light source MLD.

As described above, when the main light source MLD is in a normal state, main light from the main light source MLD may be directly provided to the modulator MOD. When the main light source MLD is in a fault state, the redundant light from the redundant light source RLD may be provided to the modulator MOD through the optical switch SW. Accordingly, since the main light source MLD is directly connected with the modulator MOD, optical loss by any other component may be reduced or minimized. In addition, in a fault situation of the main light source MLD, since the redundant light is provided from the redundant light source RLD through the optical switch SW, it may be efficient to restore the fault of the main light source MLD. Accordingly, a photonic integrated circuit with improved reliability and reduced power consumption is provided.

Figure 5A:
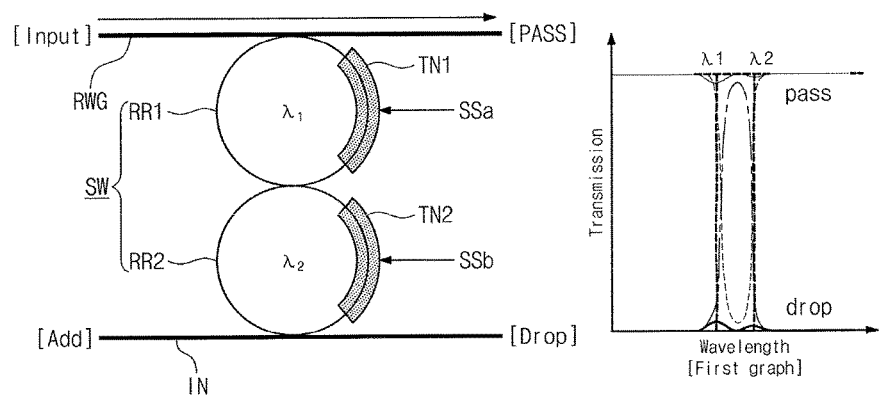
FIGS. 5A and 5B illustrate an embodiment of an optical switch.
Figure 5B:
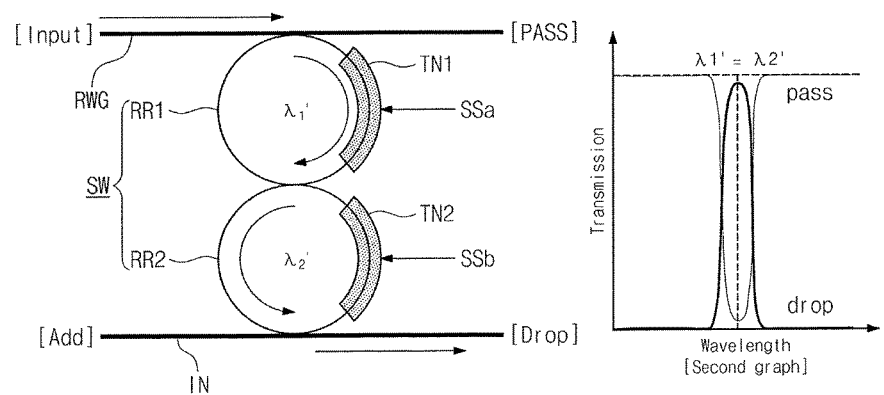

FIGS. 5A and 5B illustrate an embodiment of the optical switch SW (e.g., the wavelength selective optical switch) implemented as a ring resonator. In the graphs of FIGS. 5A and 5B, the X-axis corresponds to wavelength and the Y-axis corresponds to transmission. The optical switch SW may be implemented as a different type of switch in another embodiment.

First, referring to FIGS. 3, 5A, and 5B, the optical switch SW may include first and second ring resonators RR1 and RR2 and first and second tuners TN1 and TN2. The first and second ring resonators RR1 and RR2 may be connected or coupled in series between the redundant waveguide RWG and the first input waveguide IN1. The first ring resonator RR1 may resonate an input light of a first center wavelength XL The second ring resonator RR2 may resonate an input light of a second center wavelength λ2.

The first tuner TN1 may tune the first center wavelength λ1 of the first ring resonator RR1 based on a switch signal SSa. The second tuner TN2 may tune the second center wavelength λ2 of the second ring resonator RR2 based on a switch signal SSb. For example, the first and second tuners TN1 and TN2 may be heaters heated based on the switch signals SSa and SSb. Refractive indexes of waveguides of the first and second ring resonators RR1 and RR2 may change depending on temperatures of the first and second tuners TN1 and TN2. As a result, the first and second center wavelengths λ1 and λ2 may change.

As illustrated in the graph of FIG. 5A, the first and second tuners TN1 and TN2 may be adjusted such that the first and second center wavelengths λ1 and λ2 of the first and second ring resonators RR1 and RR2 do not coincide with each other. In this case, an optical coupling condition between the first and second ring resonators RR1 and RR2 is not established. Accordingly, redundant light provided through the redundant waveguide RWG is output to a pass terminal PASS. For example, when the first and second center wavelengths λ1 and λ2 do not coincide with each other, a progress path of redundant light may not be changed.

As illustrated in the graph of FIG. 5B, the first and second tuners TNI and TN2 may be adjusted such that the first and second center wavelengths λ1 and λ2 of the first and second ring resonators RR1 and RR2 coincide with each other. In this case, an optical coupling condition between the first and second ring resonators RR1 and RR2 is established. Accordingly, redundant light provided through the redundant waveguide RWG may be provided to a drop terminal DROP (e.g., modulator MOD of FIG. 3) through the first and second ring resonators RR1 and RR2 and the first input waveguide IN1. For example, when the first and second center wavelengths λ1 and λ2 coincide with each other, a progress path of a redundant light may be changed.

In an embodiment, the optical switch SW illustrated in FIG. 5A may be in an inactive state or a "bar" state. The optical switch SW illustrated in FIG. 5B may be in an active state or a "cross" state. In an embodiment, the switch signals SSa and SSb illustrated in FIGS. 5A and 5B may be in the first switch signal SS described with reference to FIGS. 3 to 4B. The switch signal SW for controlling one optical switch SW may include, for example, a plurality of signals.

As illustrated in FIGS. 5A and 5B, the optical switch SW (e.g., wavelength selective optical switch) includes ring resonators RR1 and RR2 connected in series. In one embodiment, the optical switch SW may include only some of components described with reference to FIGS. 5A and 5B.

In one embodiment, the optical switch SW may be implemented with another type of wavelength selective optical switch.

In an embodiment, the optical switch SW of an active state (e.g., as illustrated in FIG. 5B) may have an optical loss characteristic of about 1 dB, and the optical switch SW of an inactive state illustrated in FIG. 5A may have an optical loss characteristic of about 0.1 dB. Since the optical loss characteristic is low compared with any other component (e.g., an optical filter), power consumption of the photonic integrated circuit 100 may decrease.

Figure 6:
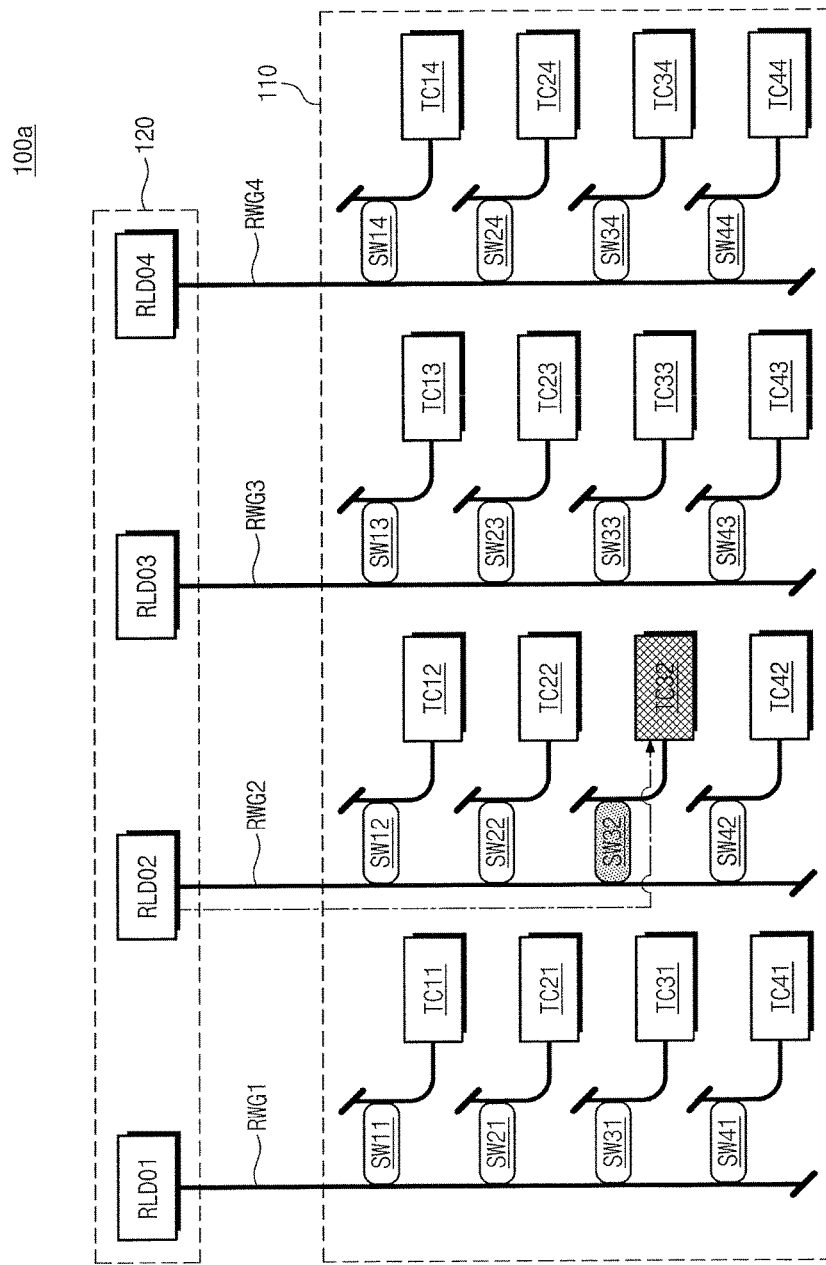
FIGS. 6 to 16 illustrate additional embodiments of a photonic integrated circuit.

FIG. 6 illustrates another embodiment of a photonic integrated circuit 100a which includes 16 transmitter cells TC11 to TC44. Each of the transmitter cells TC11 to TC44 may be the transmitter cell TC or TC' described, for example, with reference to FIG. 2A or 2B. The optical transmitter 110 may include a different number of transmitter cells in another embodiment.

The switch signal SS (e.g., refer to FIG. 1) for controlling a plurality of optical switches SW is omitted. However, as described above, it may be understood that each of the optical switches SW is enabled or disabled by a separate switch signal from the controller 130.

The term or expression "fault of a specific transmitter cell" or "that a specific transmitter cell is faulty" below may mean that a main light source in the specific transmitter cell is faulty. The fault of the specific transmitter cell may be detected by the photo detector PD in the specific transmitter cell. The controller 130 may control the switch signal SW depending on the detection result of the photo detector PD such that the corresponding optical switch SW (e.g., an optical switch connected with an input waveguide of the specific transmitter cell) is enabled. The corresponding optical switch SW may provide redundant light to the specific transmitter cell through the input waveguide of the specific transmitter cell based on the enabled switch signal.

The term "main optical switch" may represent an optical switch connected with an input waveguide and the redundant waveguide RWG of the transmitter cell TC. The term "redundant optical switch" may represent an optical switch connected between the redundant light sources RLD or connected between the redundant light sources RLD and the redundant waveguide RWG. In one embodiment, the "main optical switch" and "redundant optical switch" may have the same or similar configurations, and the terms may be interchangeably used.

Referring to FIG. 6, the photonic integrated circuit 100 may include the optical transmitter 110 and the redundant optical block 120. The optical transmitter 110 includes the transmitter cells TC11 to TC44 and a plurality of main optical switches SW11 to SW44. An input waveguide of the transmitter cell TC11 is connected with the main optical switch SW11. An input waveguide of the transmitter cell TC12 is connected with the main optical switch SW12. Input waveguides of the transmitter cells TC11 to TC44 are connected with the main optical switches SW11 to SW44, as illustrated in FIG. 6.

The main optical switches SW11 to SW44 are connected with the redundant waveguides RWG1 to RWG4. For example, the main optical switches SW11, SW21, SW31, and SW41 are connected with the first redundant waveguide RWG1. The main optical switches SW12, SW22, SW32, and SW42 are connected with the second redundant waveguide RWG2. The main optical switches SW13, SW23, SW33, and SW43 are connected with the third redundant waveguide RWG3. The main optical switches SW14, SW24, SW34, and SW44 are connected with the fourth redundant waveguide RWG4.

The main optical switches SW11 to SW44 may provide, for example, redundant lights from the redundant waveguides RWG1 to RWG4 to the corresponding transmitter cells TC11 to TC44.

The redundant optical block 120 may include a plurality of redundant light sources RLD01 to RLD04. The redundant optical block 120 may be connected with the optical transmitter 110 through the redundant waveguides RWG1 to RWG4. For example, the first redundant light source RLD01 is connected with the first redundant waveguide RWG1. The second redundant light source RLD02 is connected with the second redundant waveguide RWG2. The third redundant light source RLD03 is connected with the third redundant waveguide RWG3. The fourth redundant light source RLD04 is connected with the fourth redundant waveguide RWG4.

The first to fourth redundant light sources RLD01 to RDLO4 may provide redundant lights to faulty transmitter cells through the first to fourth redundant waveguides RWG1 to RWG4 and the main optical switches SW11 to SW44.

For example, it may be assumed that the transmitter cell TC32 is faulty, e.g., when a main light source in the transmitter cell TC32 is faulty. In this case, the main optical switch SW32 may be enabled based on a switch signal from the controller 130. The enabled main optical switch SW32 may provide redundant light from the second redundant light source RLD02, provided through the second redundant waveguide RWG2, to an input waveguide of the transmitter cell TC32. In an embodiment, a transmission path of redundant light is illustrated by a broken line in FIG. 6.

For example, the redundant light, provided from the second redundant light source RLD02 through the second redundant waveguide RWG2, may be provided to the transmitter cell TC32 through the optical switch SW32 and the input waveguide of the transmitter cell TC32. The transmitter cell TC32 may modulate the redundant light provided through the input waveguide, instead of the fault main light source, to generate an optical signal and may output the generated optical signal.

Power to the main light source MLD of the faulty transmitter cell TC32 may be interrupted to remove noise of an optical signal. In an embodiment, power to redundant light sources RLD01, RLD03, and RLD04 that are not used for a restoration operation may be interrupted.

An embodiment in which one transmitter cell TC32 among the transmitter cells TC11 to TC44 is faulty is described. In one embodiment, when the transmitter cells TC11, TC32, TC33, and TC44 are faulty, the corresponding main optical switches SW11, SW32, SW33, and SW44 may be enabled. In this case, redundant lights provided through the first to fourth redundant waveguides RWG1 to RWG4 may be transmitted to the faulty transmitter cells TC11, TC32, TC33, and TC44 through the main optical switches SW11, SW32, SW33, and SW44, respectively, and the faulty transmitter cells TC11, TC32, TC33, and TC44 may use the received redundant lights instead of main light sources.

For example, according to the embodiment of FIG. 6, one redundant light source RLD may be connected with one redundant waveguide RWG, one redundant waveguide RWG may be connected with a plurality of main optical switches SW, and the plurality of main optical switches SW may be respectively connected with a plurality of transmitter cells TC. When at least one of a plurality of transmitter cells TC is faulty, the corresponding main optical switch of a plurality of main optical switches SW may be enabled. Thus, redundant light from a redundant light source RLD may be provided to the faulty transmitter cell. In other words, one redundant light source RLD may be used to restore a fault of a plurality of transmitter cells (or a plurality of main light sources). Accordingly, since the number of redundant light sources for restoring a fault of a transmitter cell (or main light source) decreases, the costs to manufacture a photonic integrated circuit may decrease.

In an embodiment, the structure of the photonic integrated circuit 100 described with reference to FIG. 6 is exemplary. In one embodiment, the main optical switches SW11 to SW44 may be implemented with a separate semiconductor chip, a separate semiconductor die, a separate semiconductor package, or a separate semiconductor module. In this case, the main optical switches SW11 to SW44 may be connected with the optical transmitter 110 through input waveguides of the transmitter cells TC11 to TC44, and may be connected with the redundant optical block 120 through the redundant waveguides RWG1 to RWG4. In one embodiment, the optical switches SW11 to SW44 may be in the redundant optical block 120. In this case, the redundant optical block 120 may be connected with the optical transmitter 110 through the input waveguides of the transmitter cells TC11 to TC44.

Figure 7:
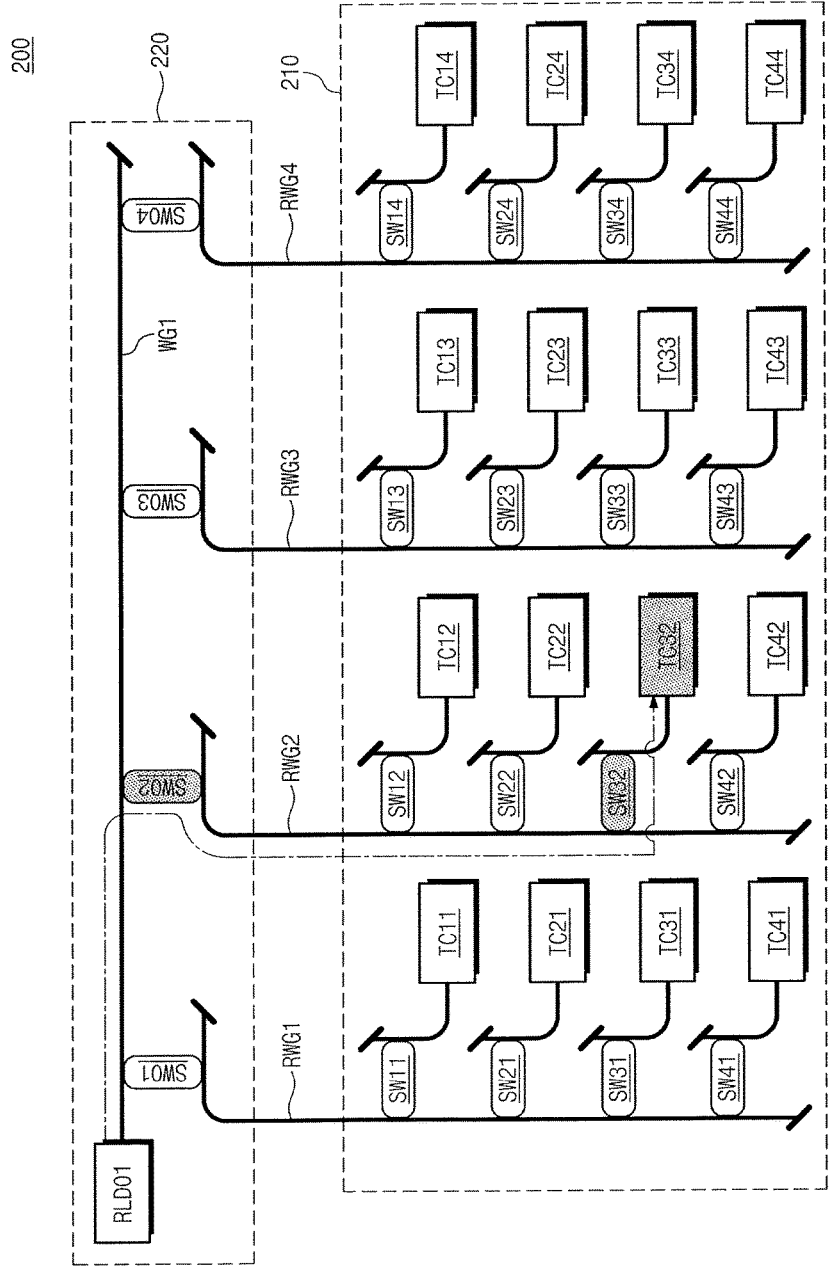

FIG. 7 illustrates another embodiment of a photonic integrated circuit 200 which may include an optical transmitter 210 and a redundant optical block 220. The optical transmitter 210 includes the plurality of transmitter cells TC11 to TC44 and the plurality of main optical switches SW11 to SW44. FIG. 6 shows an embodiment in which one redundant light source is connected with one redundant waveguide. However, FIG. 7 shows an embodiment in which a plurality of redundant waveguides RWG1 to RWG4 is connected with one redundant light source RLD01.

The redundant optical block 220 may include, for example, the first redundant light source RLD01 and first to fourth redundant optical switches SW01 to SW04. The first redundant light source RLD01 is connected with a first waveguide WG1 (or a redundant light source connection waveguide). A redundant light source connection waveguide that is used to connect redundant light sources may simply be referred to as a waveguide.

The first to fourth redundant optical switches SW01 to SW04 may be respectively connected between first to fourth redundant waveguides RWG1 to RWG4 and the first waveguide WG1. For example, the first redundant light source RLD01 is connected with the first redundant waveguide RWG1 through the first redundant optical switch SW01, is connected with the second redundant waveguide RWG2 through the second redundant optical switch SW02, is connected with the third redundant waveguide RWG3 through the third redundant optical switch SW03, and is connected with the fourth redundant waveguide RWG4 through the fourth redundant optical switch SW04.

For example, it may be assumed that the transmitter cell TC32 is faulty. In this case, the redundant optical switch SW02 and the main optical switch SW32 are enabled to provide redundant light of the first redundant light source RLD01 to the transmitter cell TC32. In this case, redundant light from the first redundant light source RLD01 may be provided to the faulty transmitter cell TC32 through the first waveguide WG1, the redundant optical switch SW02, the second redundant waveguide RWG2, the main optical switch SW32, and an input waveguide of the transmitter cell TC32. In FIG. 7, the transmission path of redundant light is illustrated, for example, by a broken line.

In an embodiment, the structure of the photonic integrated circuit 200 illustrated in FIG. 7 is exemplary. In one embodiment, the plurality of main optical switches SW11 to SW44 may be implemented with a separate device. In one embodiment, the plurality of redundant optical switches SW01 to SW04, the plurality of main optical switches SW11 to SW44, or a combination thereof may be implemented with a separate device. In one embodiment, the plurality of redundant optical switches SW01 to SW04, the plurality of main optical switches SW11 to SW44, or a combination thereof may be in the optical transmitter 210, and the redundant optical block 220 may be connected with the optical transmitter 210 through the first waveguide WG1. In one embodiment, the plurality of redundant optical switches SW01 to SW04, the plurality of main optical switches SW11 to SW44, or a combination thereof may be in the redundant optical block 220, and the redundant optical block 220 may be connected with the optical transmitter 210 through input waveguides of the transmitter cells TC11 to TC44.

Figure 8:
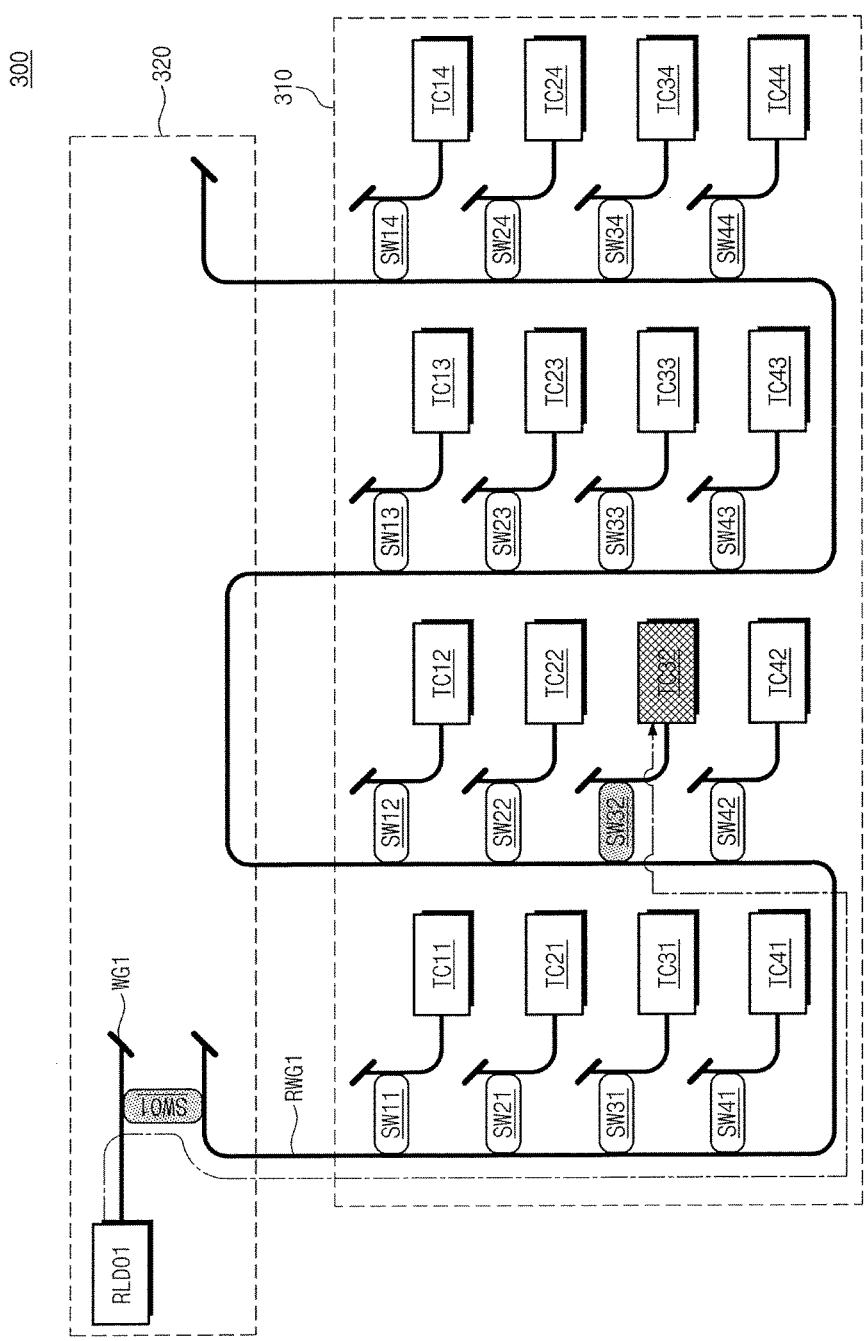

FIG. 8 illustrates an other embodiment of a photonic integrated circuit 300 which may include an optical transmitter 310 and a redundant optical block 320. The optical transmitter 310 includes the plurality of transmitter cells TC11 to TC44 and the plurality of main optical switches SW11 to SW44. A detailed description associated with components that are similar to the above-described components is omitted.

The redundant optical block 320 includes the first redundant light source RLD01 and the first redundant optical switch SW01. The first redundant optical switch SW01 is connected between the first waveguide WG1 and the first redundant waveguide RWG1.

Unlike the embodiments of FIGS. 6 and 7, the embodiment of FIG. 8 shows a structure in which the plurality of main optical switches SW11 to SW44 are connected with one redundant waveguide RWG1. For example, the embodiment of FIG. 7 shows a configuration in which the 16 transmitter cells TC11 to TC44 are connected with the four redundant waveguides RWG1 to RWG4, and the four redundant waveguides RWG1 to RWG4 are connected with the four redundant optical switches SW01 to SW04 such that one redundant light source RLD01 is used. The embodiment of FIG. 8 shows a configuration in which the 16 transmitter cells TC11 to TC44 are connected with the one redundant waveguide RWG1, and the one redundant waveguide RWG1 is connected with the one redundant optical switch SW01, such that one redundant light source RLD01 is used.

For example, it may be assumed that the transmitter cell TC32 is faulty. In this case, the redundant optical switch SW01 and the main optical switch SW32 may be enabled. Accordingly, redundant light from the redundant light source RLD01 may be provided to the transmitter cell TC32 through the first waveguide WG1, the redundant optical switch SW01, the first redundant waveguide RWG1, the main optical switch SW32, and an input waveguide of the transmitter cell TC32. The transmitter cell TC32 may use the received redundant light instead of a main light source. The transmission path of redundant light is illustrated by an alternated long and short dash line in FIG. 8.

In an embodiment, the structure of the photonic integrated circuit 300 illustrated in FIG. 8 is exemplary. In one embodiment, the main optical switches SW11 to SW44, the redundant optical switch SW01, or a combination thereof may be implemented with a separate device, may be in the optical transmitter 310, or may be in the redundant optical block 320. In one embodiment, the first redundant waveguide RWG1 may be divided into a plurality of regions, and some of the plurality of regions may be outside the optical transmitter 310 or may be in the redundant optical block 320.

According to the above-described embodiments, it may be possible to restore the fault of M transmitter cells TC (or M main light sources) using N redundant light sources RLD (N being a natural number, and M being a natural number greater than N). The number of redundant light sources RLD or the arrangement or connection relationship of the redundant light sources RLD and the transmitter cells TC may be different in other embodiments depending, for example, on process yield, fault rate, etc., of the transmitter cells TC.

Figure 9:
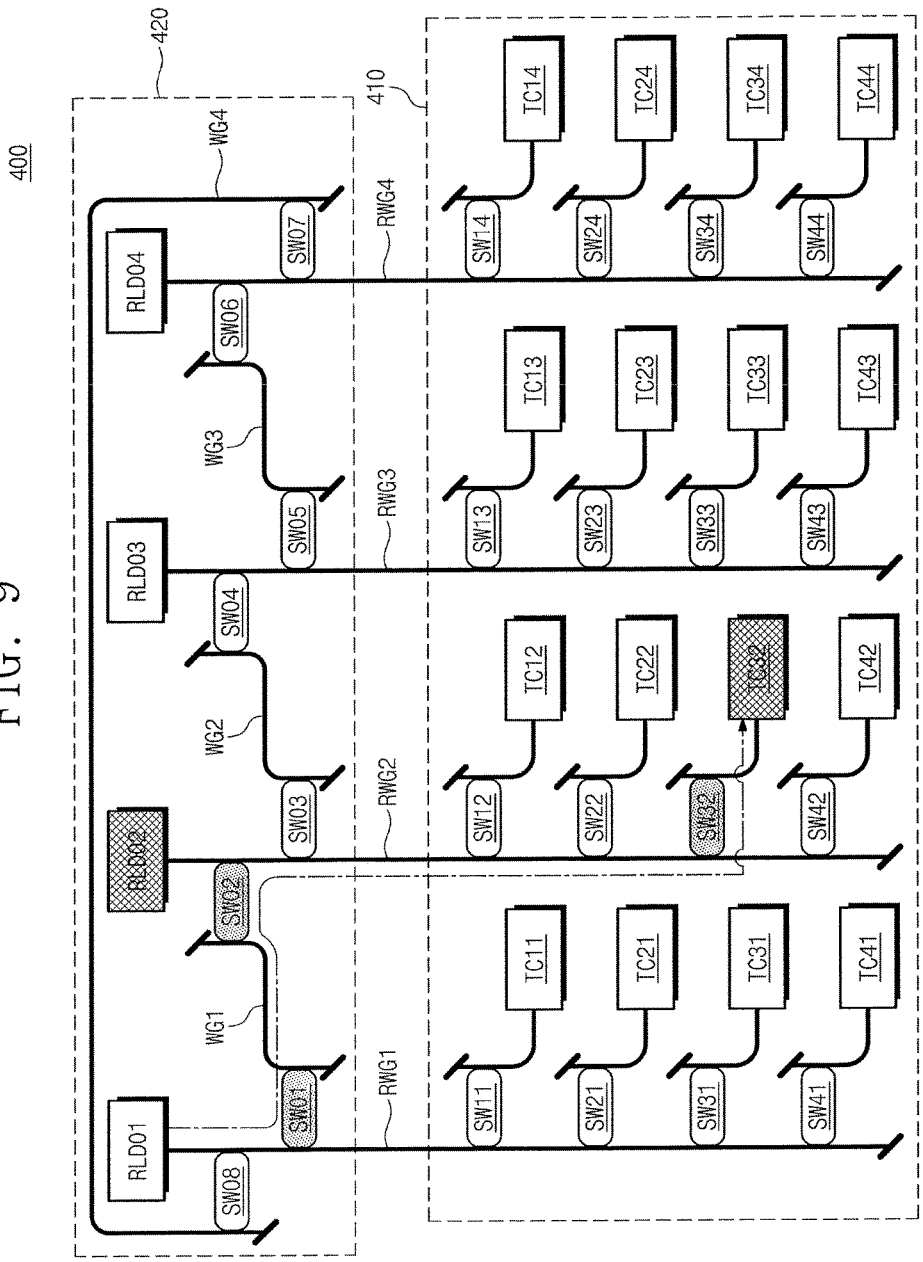

FIG. 9 illustrates another embodiment of a photonic integrated circuit 400 which may include an optical transmitter 410 and a redundant optical block 420. The optical transmitter 410 includes the plurality of transmitter cells TC11 to TC44 and the plurality of main optical switches SW11 to SW44.

The redundant optical block 420 may include the plurality of redundant light sources RLD01 to RLD04 and a plurality of redundant optical switches SW01 to SW08. The redundant light sources RLD01 to RLD04 may be connected with the optical transmitter 410 through the plurality of redundant waveguides RWG1 to RWG4.

In an embodiment, the redundant light sources RLD01 to RLD04 may be connected to each other through the redundant optical switches SW01 to SW08 and a plurality of waveguides WG1 to WG4. For example, the first redundant optical switch SW01 is connected between the first redundant waveguide RWG1 and the first waveguide WG1, the second redundant optical switch SW02 is connected between the first waveguide WG1 and the second redundant waveguide RWG2, the third redundant optical switch SW03 is connected between the second redundant waveguide RWG2 and the second waveguide WG2, and the fourth redundant optical switch SW04 is connected between the second waveguide WG2 and the third redundant waveguide RWG3.

In addition, the fifth redundant optical switch SW05 is connected between the third redundant waveguide RWG3 and the third waveguide WG3, the sixth redundant optical switch SW06 is connected between the third waveguide WG3 and the fourth redundant waveguide RWG4, the seventh redundant optical switch SW07 is connected between the fourth redundant waveguide RWG4 and the fourth waveguide WG4, and the eighth redundant optical switch SW08 is connected between the fourth waveguide WG4 and the first redundant waveguide RWG1.

As described above, since the redundant light sources RLD01 to RLD04 are connected to each other, it may be possible to restore the fault of the redundant light sources RLD01 to RLD04. For example, it may be assumed that the second redundant light source RLD02 and the transmitter cell TC32 are faulty. When the second redundant light source RLD02 is not faulty, the optical switch SW32 may be enabled. Thus, redundant light from the second redundant light source RLD02 may be provided to the transmitter cell TC32. However, the redundant light from the second redundant light source RLD02 may not be provided when the second redundant light source RLD02 is faulty. In this case, redundant light from the first redundant light source RLD01 may be provided to the second redundant waveguide RWG2 through the first redundant optical switch SW01, the first waveguide WG1, and the second redundant optical switch SW02 by activating the first and second redundant optical switches SW01 and SW02. Thus, the redundant light from the first redundant light source RLD01 may be provided to the transmitter cell TC32 through the optical switch SW32.

In an embodiment, when the second redundant light source RLD02 is faulty, the third and fourth redundant optical switches SW03 and SW04 may be enabled. Thus, the third redundant light source RLD03 may be used instead of the fault second redundant light source RLD02. In an embodiment, a specific redundant light source may be selected based on a physical location, a physical connection relationship, etc., of the faulty transmitter cell TC in order to restore the fault of the redundant light source.

According to the above-described embodiment, the photonic integrated circuit 400 may connect the redundant light sources RLD01 to RLD04 through the optical switches SW01 to SW08, thereby making it possible to cope with a situation in which redundant light sources are faulty.

Figure 10:
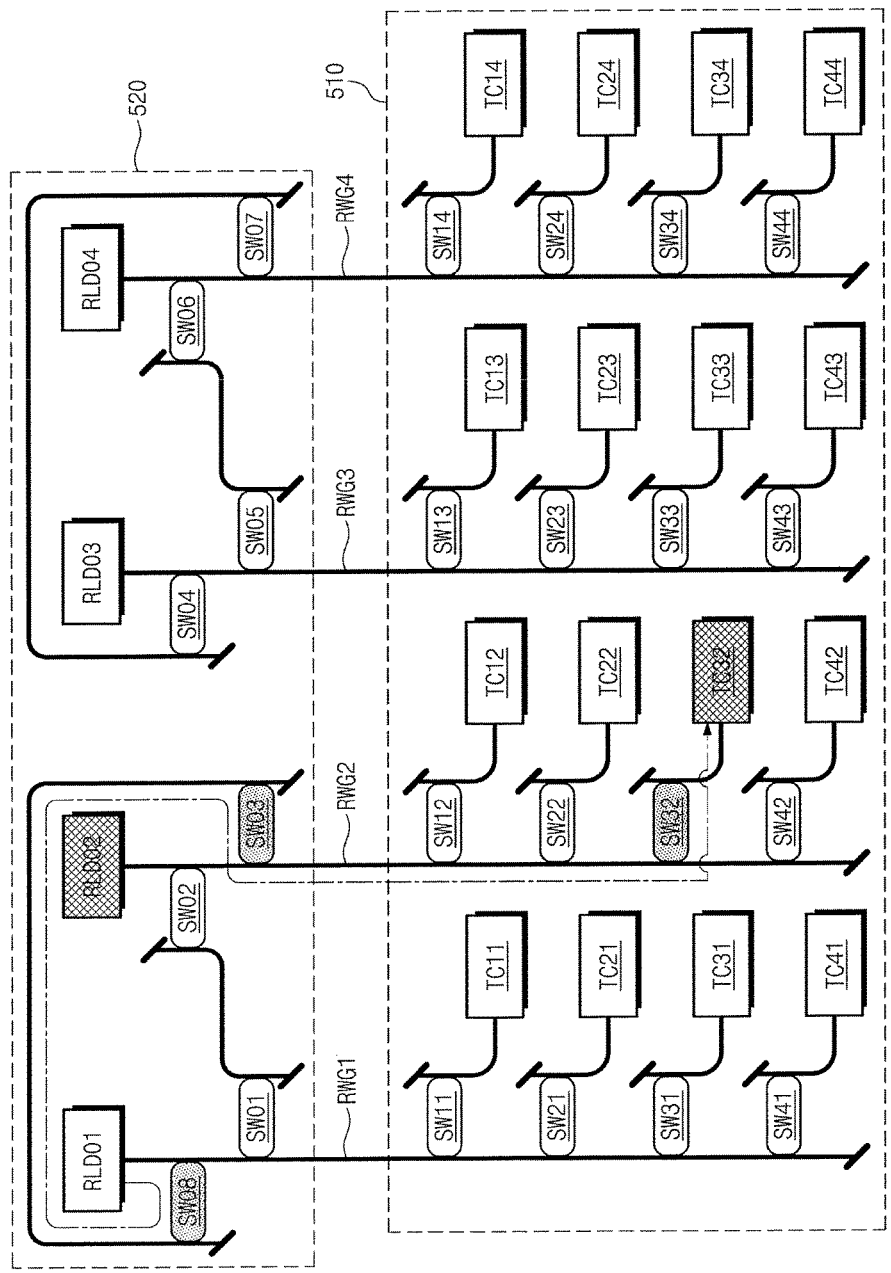

FIG. 10 illustrates another embodiment of a photonic integrated circuit 510 which may include the plurality of transmitter cells TC11 to TC44 and the plurality of main optical switches SW11 to SW44. A redundant optical block 520 may include the plurality of redundant light sources RLD01 to RLD04 and the plurality of redundant optical switches SW01 to SW08.

Unlike the embodiment of FIG. 9, according to the embodiment of FIG. 10, the first and second redundant light sources RLD01 and RLD02 are connected to each other through the redundant optical switches SW01, SW02, SW03, and SW08, and the third and fourth redundant light sources RLD03 and RLD04 are connected to each other through the redundant optical switches SW04, SW05, SW06, and SW07. That is, in the photonic integrated circuit 500, redundant light sources disposed physically adjacent to each other may be connected to each other so as to cope with the fault of a redundant light source.

For example, it may be assumed that the second redundant light source RLD02 and the transmitter cell TC32 are faulty. In this case, the redundant optical switches SW08 and SW03 and the main optical switch SW32 may be enabled. Thus, redundant light from the first redundant light source RLD01 may be provided to the transmitter cell TC32. Likewise, when the third redundant light source RLD03 is faulty, the redundant optical switches SW05 and SW06 may be enabled. Thus, the fourth redundant light source RLD04 may be used to restore a fault of one of the transmitter cells TC13 to TC43, instead of the third redundant light source RLD03.

As described above, according to an embodiment, it may be possible to cope with a fault situation of a plurality of redundant light sources by connecting a plurality of redundant light sources using a plurality of optical switches. Accordingly, a photonic integrated circuit with improved reliability is provided.

Figure 11:
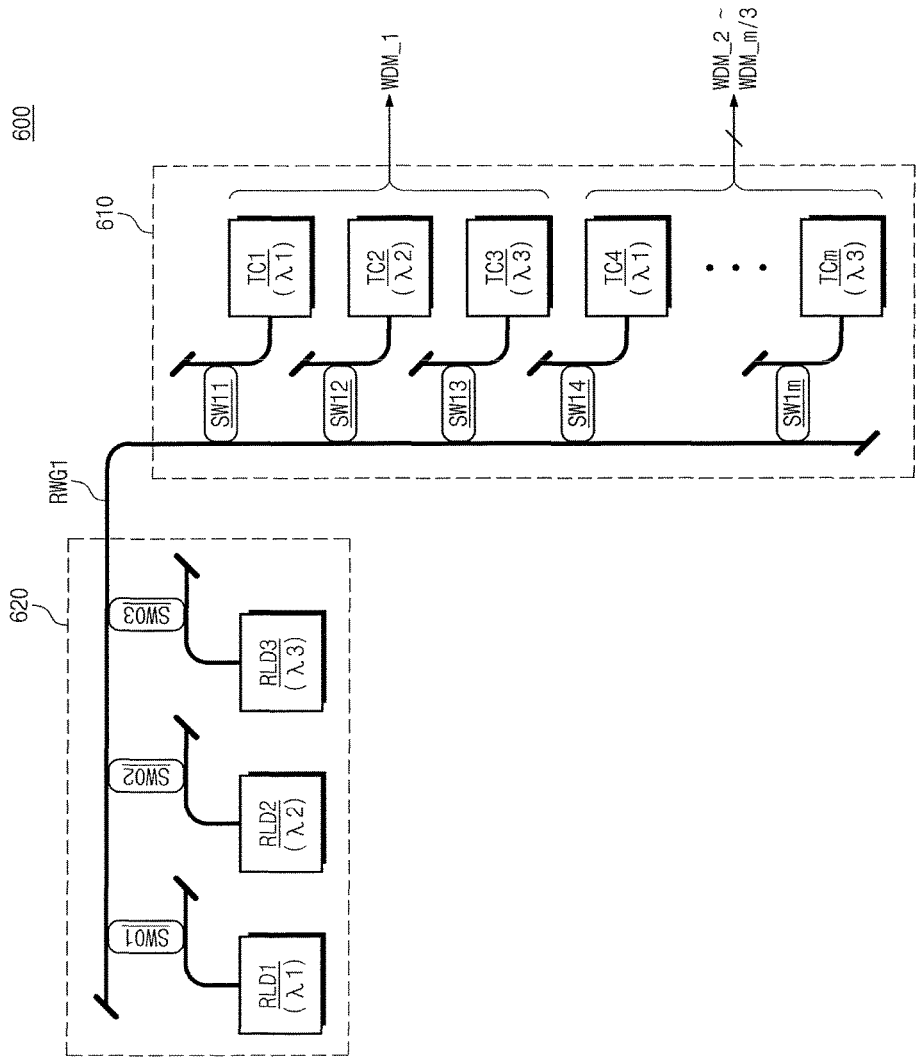

FIG. 11 illustrates another embodiment of a photonic integrated circuit 600 which may include an optical transmitter 610 and a redundant optical block 620. The optical transmitter 610 includes a plurality of transmitter cells TC1 to TCm and a plurality of main optical switches SW11 to SW1m. Input waveguides of the transmitter cells TC1 to TCm may be connected with a first redundant optical waveguide RWG1 through the main optical switches SW11 to SW1m.

The transmitter cells TC1 to TCm may generate optical signals using light of different wavelengths. For example, the first transmitter cell TC1 may include a main light source for generating light of a first wavelength $\lambda 1$ and may generate an optical signal using the light of the first wavelength $\lambda 1$. The second transmitter cell TC2 may include a main light source for generating a light of a second wavelength $\lambda 2$ and may generate an optical signal using the light of the second wavelength $\lambda 2$. The third transmitter cell TC3 may include a main light source for generating light of a third wavelength $\lambda 3$ and may generate an optical signal using the light of the third wavelength $\lambda 3$. Each of the fourth to m-th transmitter cells TC4 to TCm may include a main light source for generating light of the corresponding one of the first to third wavelengths $\lambda 1$ to $\lambda 3$ and may generate an optical signal using the light of the corresponding wavelength.

Since the first to third transmitter cells TC1 to TC3 use light of different wavelengths, output optical signals of the first to third transmitter cells TC1 to TC3 may be provided through one waveguide or transmission line using wavelength division multiplexing (WDM). For example, the first to third transmitter cells TC1 to TC3 may constitute a first WDM channel WDM 1, and the fourth to m-th transmitter cells TC4 to TCm may constitute second to (m/3)-th WDM channels WDM_2 to WMD_m/3.

The redundant optical block 620 may include first to third redundant light sources RLD1 to RLD3 and redundant optical switches SW01 to SW03. The first to third redundant light sources RLD1 to RLD3 may output redundant lights of the first to third wavelengths $\lambda 1$ to $\lambda 3$, respectively. As described above, since redundant light from the first to third redundant light sources RLD1 to RLD3 have different wavelengths, the redundant light may be simultaneously provided through one waveguide, e.g., the first redundant waveguide RWG1.

In an embodiment, each of the main optical switches SW11 to SW1m may be configured to have the same center wavelength as a wavelength of light used in the corresponding transmitter cell. For example, the main optical switch SW11 connected with the first transmitter cell TC1 may have a center wavelength of the first wavelength $\lambda 1$ and may change a path of a redundant light of the first wavelength $\lambda 1$ from the first redundant waveguide RWG 1 to an input waveguide of the first transmitter cell TC1 based on a switch signal. For example, the main optical switch SW12 connected with the second transmitter cell TC2 may have a center wavelength of the second wavelength $\lambda 2$ and may change a path of redundant light of the second wavelength $\lambda 2$ from the first redundant waveguide RWG1 to an input waveguide of the second transmitter cell TC2 based on a switch signal.

For example, when the second transmitter cell TC2 is faulty, the redundant optical switch SW02 and the main optical switch SW12 may be enabled. Thus, redundant light of the second wavelength $\lambda 2$ may be provided from the second redundant light source RLD2 to the second transmitter cell TC2. In one embodiment, when the fourth transmitter cell TC4 is faulty, the redundant optical switch SW01 and the main optical switch SW14 may be enabled. Thus, redundant light of the first wavelength $\lambda 1$ may be provided from the first redundant light source RLD1 to the fourth transmitter cell TC4. In an embodiment, in both cases described above, all the optical switches SW01, SW02, and SW03 in the redundant optical block 620 may be enabled. The reason is that the redundant light sources RLD1 to RLD3 output redundant lights of different wavelengths and the main optical switches SW12 and SW14 operate only with respect to redundant lights of the corresponding wavelengths $\lambda 2$ and $\lambda 1$.

As described above, when the photonic integrated circuit 600 uses a plurality of lights of different wavelengths, a fault of a transmitter cell or a main light source may be restored using redundant light sources for generating redundant light of different wavelengths.

Figure 12:
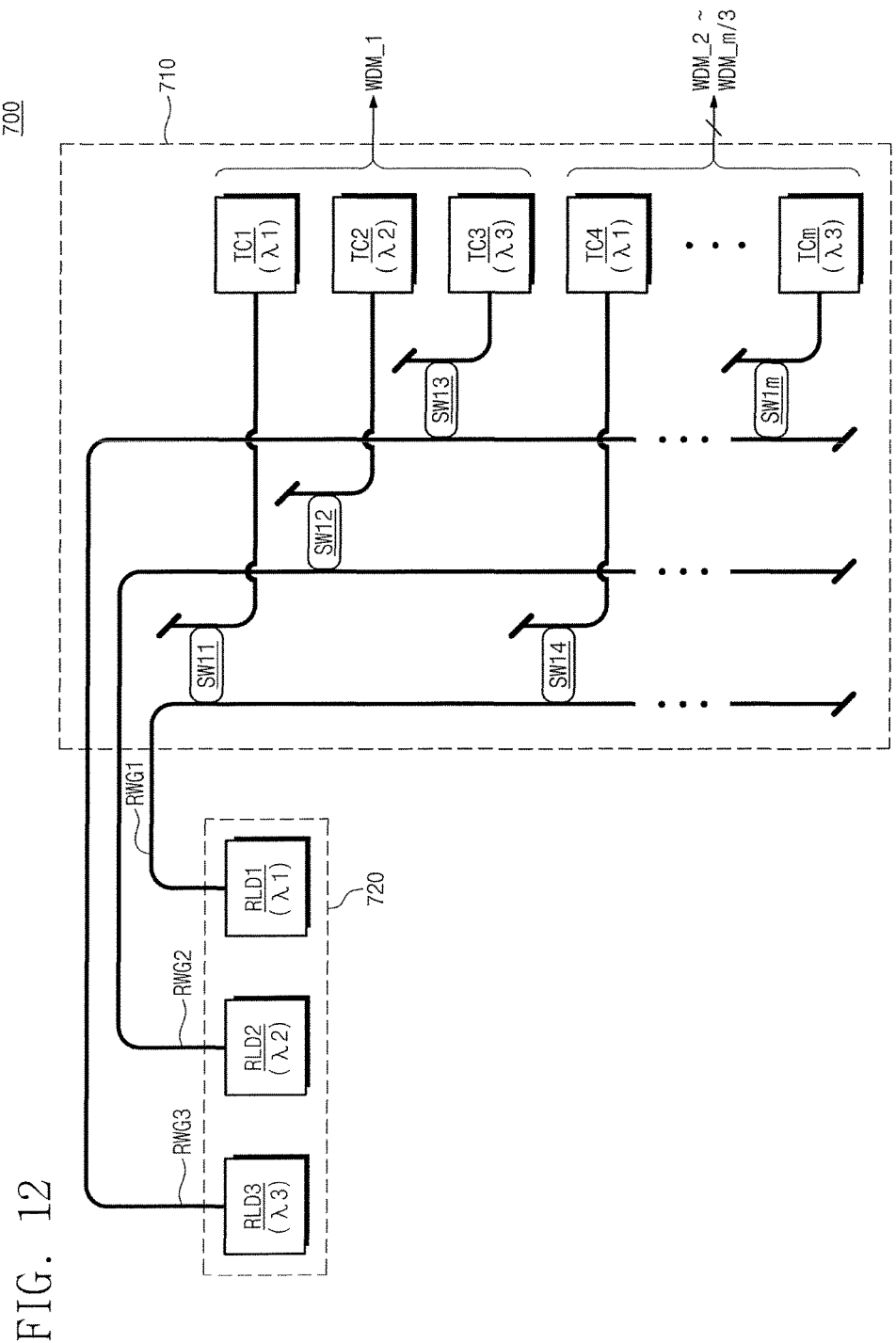

FIG. 12 illustrates another embodiment of a photonic integrated circuit 700 which may include an optical transmitter 710 and a redundant optical block 720. The optical transmitter 710 includes the plurality of transmitter cells TC1 to TCm and the plurality of main optical switches SW11 to SW1m. The redundant optical block 720 may include the plurality of redundant light sources RLD1 to RLD3.

According to the embodiment of FIG. 12, unlike the embodiment of FIG. 11, transmitter cells operating based on a light of the same wavelength are connected with the same redundant waveguide. For example, the first redundant light source RLD1 for generating a redundant light of the first wavelength $\lambda 1$ is connected with the first redundant waveguide RWG1. The first and fourth transmitter cells TC1 and TC4 using the light of the first wavelength $\lambda 1$ are connected with the first redundant waveguide RWG1 through the main optical switches SW11 and SW14. For example, transmitter cells using the light of the first wavelength $\lambda 1$ are connected with the first redundant waveguide RWG1. When the transmitter cells are faulty, redundant light of the first wavelength $\lambda 1$ may be provided from the first redundant light source RLD1 to the first redundant waveguide RWG1, The redundant light of the first wavelength $\lambda 1$ may be provided to a faulty transmitter cell from the first redundant waveguide RWG1 by the corresponding main optical switch.

The second redundant light source RLD2 for outputting redundant light of the second wavelength $\lambda 2$ is connected with the second redundant waveguide RWG2. The third redundant light source RLD3 for outputting redundant light of the third wavelength $\lambda 3$ is connected with the third redundant waveguide RWG3. Transmitter cells (e.g., TC2) using the light of the second wavelength $\lambda 2$ are connected with the second redundant waveguide RWG2 through the corresponding main optical switch. Transmitter cells (e.g., TC3 and TCm) using the light of the third wavelength $\lambda 3$ are connected with the third redundant waveguide RWG3 through the corresponding main optical switch. When the corresponding main optical switch is enabled, each of the transmitter cells TC1 to TCm may receive redundant light through a redundant waveguide connected thereto.

Figure 13:
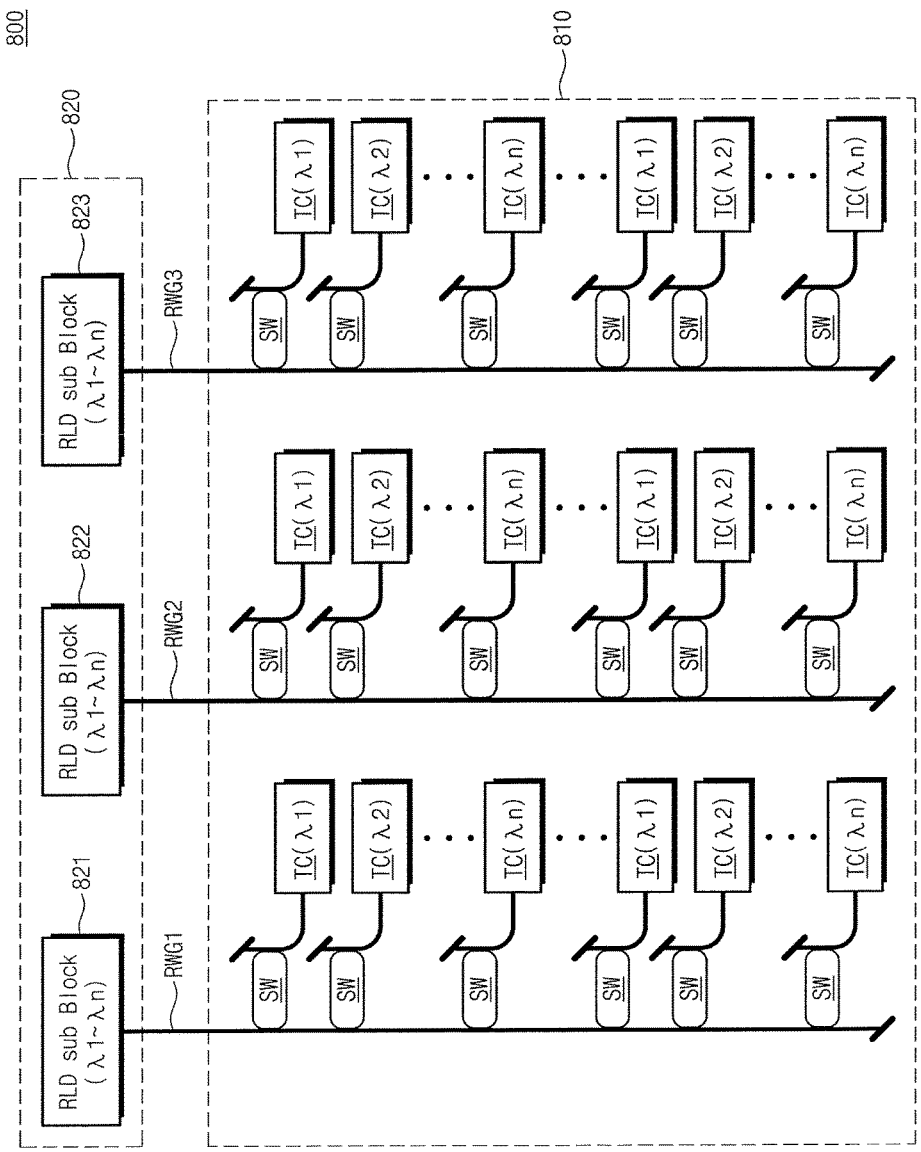

FIG. 13 illustrates an embodiment of a photonic integrated circuit 800 which may include an optical transmitter 810 and a redundant optical block 820. The optical transmitter 810 includes a plurality of transmitter cells TC and a plurality of main optical switches SW. Examples of a connection relationship of the transmitter cells TC and the main optical switches SW are described above. In an embodiment, the transmitter cells TC may generate optical signals using light of different wavelengths $\lambda 1$ to $\lambda n$. The optical switches SW may have different center wavelengths $\lambda 1$ to $\lambda n$. Examples of wavelengths of light that the transmitter cells TC use and center wavelengths of the optical switches SW are described above.

The redundant optical block 820 may include a plurality of redundant light source (RLD) sub blocks 821 to 823. In an embodiment, each of the redundant light source sub blocks 821 to 823 may be the redundant optical block 620 or 720 described with reference to FIG. 11 or 12. For example, the redundant light source sub blocks 821 to 823 may output redundant light of different wavelengths $\lambda 1$ to $\lambda n$. For example, the first redundant light source sub block 821 may provide a plurality of redundant light of different wavelengths $\lambda 1$ to $\lambda n$ through the first redundant waveguide RWG1. The second redundant light source sub block 822 may provide a plurality of redundant light of the different wavelengths $\lambda 1$ to $\lambda n$ through the second redundant waveguide RWG2. The third redundant light source sub block 823 may provide a plurality of redundant light of the different wavelengths $\lambda 1$ to $\lambda n$ through the third redundant waveguide RWG3.

As described with reference to FIGS. 11 and 12, when at least one of the transmitter cells TC is faulty, the main optical switch SW corresponding to the faulty transmitter cell may be enabled. Thus, redundant light of the corresponding wavelength, among a plurality of redundant lights provided through a redundant waveguide, may be provided to the faulty transmitter cell TC.

An embodiment is illustrated in FIG. 13 as each of the first to third redundant waveguides RWG1 to RWG3 is one waveguide. In one embodiment, each of the first to third redundant waveguides RWG1 to RWG3 may include a plurality of sub waveguides and may be configured such that a redundant light source and transmitter cells are connected with different waveguides depending on the wavelength of light used in the transmitter cells TC, as described with reference to FIG. 12.

Also, the redundant light source sub blocks 821 to 823 in the redundant optical block 820 or the redundant light sources RLD in the redundant light source sub blocks 821 to 823 may be connected or configured in various manners as described, for example, with reference to FIGS. 6 to 10.

Figure 14:
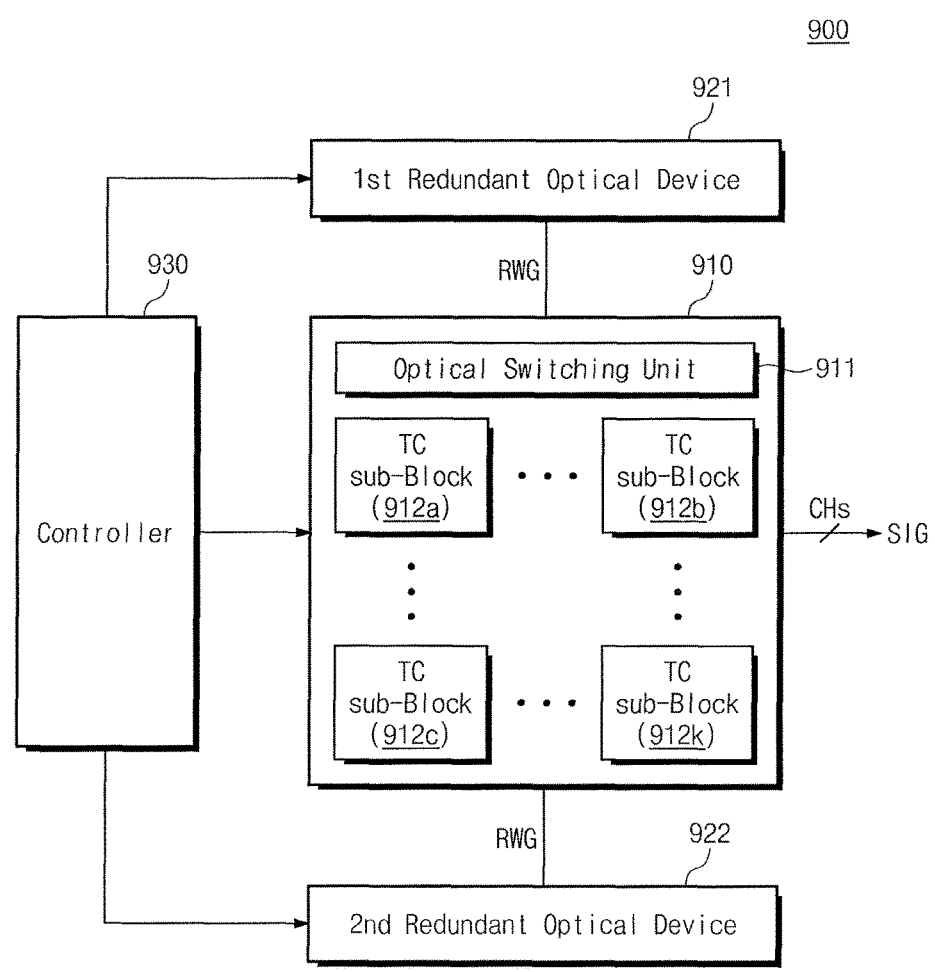

FIG. 14 illustrates an embodiment of a photonic integrated circuit 900 which may include an optical transmitter 910, first and second redundant optical blocks 921 and 922, and a controller 930.

The optical transmitter 910 may include an optical switching unit 911 and a plurality of transmitter cell sub-blocks 912a to 912k. The optical switching unit 911 may be as described above. Each of the transmitter cell sub-blocks 912a to 912k may include a plurality of transmitter cells. For example, each of the transmitter cell sub-blocks 912a to 912k may include the plurality of transmitter cells TC11 to TC44 described with reference to FIGS. 1 to 13 or more transmitter cells. In an embodiment, a plurality of transmitter cells may constitute one array, and the one array may be divided into the plurality of transmitter cell sub-blocks 912a to 912k.

Each of the first and second redundant optical blocks 921 and 922 may be one of redundant optical blocks described with reference to FIGS. 1 to 13. In an embodiment, the first redundant optical block 921 may restore a fault of a transmitter cell or a main light source with respect to some of the plurality of transmitter cell sub-blocks 912a to 912k, depending, for example, on the embodiments described with reference to FIGS. 1 to 13. The second redundant optical block 922 may restore a fault of a transmitter cell or a main light source with respect to the remaining transmitter cell sub-blocks, depending, for example, on the embodiments described with reference to FIGS. 1 to 13.

In an embodiment, optical loss due to main optical switches or redundant optical switches may increase as the number of main optical switches or redundant optical switches connected with one redundant waveguide increases. For example, referring to the arrangement of the transmitter cells TC11 to TC44 in the optical transmitter 110 of FIG. 6, when the transmitter cell TC32 is faulty, redundant light from the second redundant light source RLD02 passes through the main optical switches SW12 and SW22 that are in an inactive state. In this case, optical loss due to the main optical switches SW12 and SW22 of the inactive state may occur.

To reduce the optical loss, in addition to the second redundant light source RLD02 connected to one end of the second redundant waveguide RWG2, an additional redundant light source (e.g., the second redundant optical block 922) may be connected to an opposite end of the second redundant waveguide RWG2. When the transmitter cell TC32 is faulty and the above-described additional redundant light source (e.g., the second redundant optical block 922) is used, redundant light from the additional redundant light source may pass through only one main optical switch SW42 disabled. Thus, optical loss may be reduced or minimized by decreasing the number main optical switches or redundant optical switches through which redundant light passes.

For example, as described above, the first and second redundant optical blocks 921 and 922 may perform fault restoration on different transmitter cell sub-blocks, thereby reducing or minimizing the optical loss. In this case, transmitter cell sub-blocks managed by each of the first and second redundant optical blocks 921 and 922 may be selected such that the number of main optical switches or redundant optical switches which are physically adjacent to each of the first and second redundant optical blocks 921 and 922 or through which a redundant light passes is reduced or minimized.

The controller 930 may generate the switch signal SS for the first and second redundant optical blocks 921 and 922 to perform fault restoration on a transmitter cell or a main light source as described above.

In an embodiment, the photonic integrated circuit 900 is illustrated as including two redundant optical blocks 921 and 922 in FIG. 14. In one embodiment, the photonic integrated circuit 900 may further include additional redundant optical blocks and may reduce or minimize the number of optical switches, through which a redundant light passes, using the additional redundant optical blocks. Accordingly, since the optical loss decreases, the power consumption of the photonic integrated circuit 900 may decrease.

Figure 15:
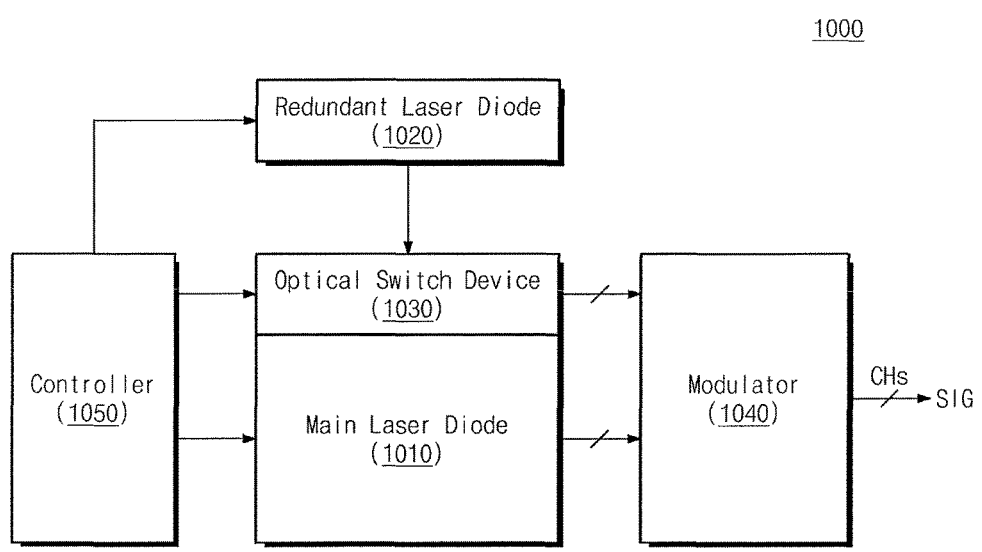

FIG. 15 illustrates another embodiment of a photonic integrated circuit 1000 which may include a main laser diode 1010 (main light source), a redundant laser diode 1020 (redundant light source), an optical switch device 1030, a modulator 1040, and a controller 1050. The photonic integrated circuits described with reference to FIGS. 1 to 14 are described with respect to an optical transmitter having transmitter cells, each including a main light source and a modulator. In the embodiment of FIG. 15, the main light source 1010 and the modulator 1040 are implemented in the photonic integrated circuit 1000 as separate devices.

For example, according to the embodiment of FIG. 15, the main light source 1010, the redundant light source 1020, the optical switch device 1030, the modulator 1040, and the controller 1050 in the photonic integrated circuit 1000 may be implemented as separate devices that are connected to each other, for example, as described with respect to one ore more of FIGS. 1 to 14. In an embodiment, the connections may be realized through separate optical fiber couplers.

Figure 16:
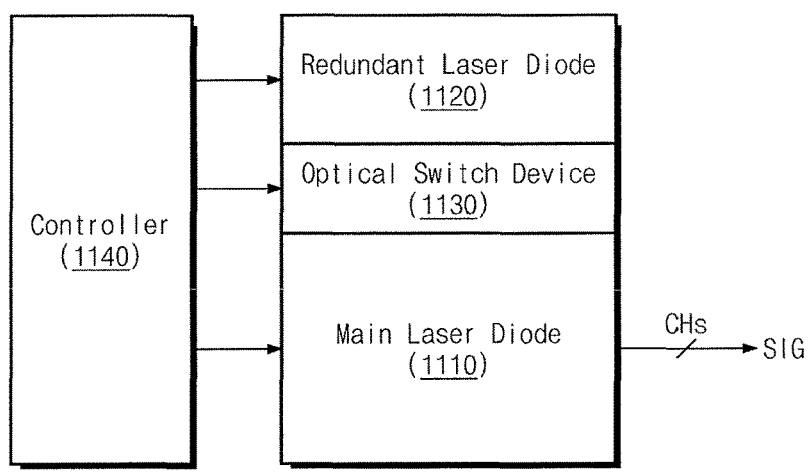

FIG. 16 illustrates another embodiment of a photonic integrated circuit 1100 which may include a main light source 1110, a redundant light source 1120, an optical switch device 1130, and a controller 1140. Unlike the photonic integrated circuit 1000 of FIG. 15, the photonic integrated circuit 1100 of FIG. 16 may not include a modulator. The controller 1140 of the photonic integrated circuit 1100 of FIG. 16 may perform direct modulation on the optical signal SIG by directly controlling a control signal to be applied to the main light source 1110. For example, the optical signal SIG that is directly modulated without a separate modulator may be output from the main light source 1110 through a plurality of channels CHs.

In an embodiment, when part of the main light source 1110 is faulty, the controller 1140 may output the optical signal SIG by controlling part of the redundant light source 1120, instead of the main light source 1110. As in the description given with reference to FIGS. 1 to 15, a redundant optical signal modulated in the redundant light source 1120 may be provided to the plurality of channels CHs through the optical switch device 1130 under control of the controller 1140.

Figure 17:
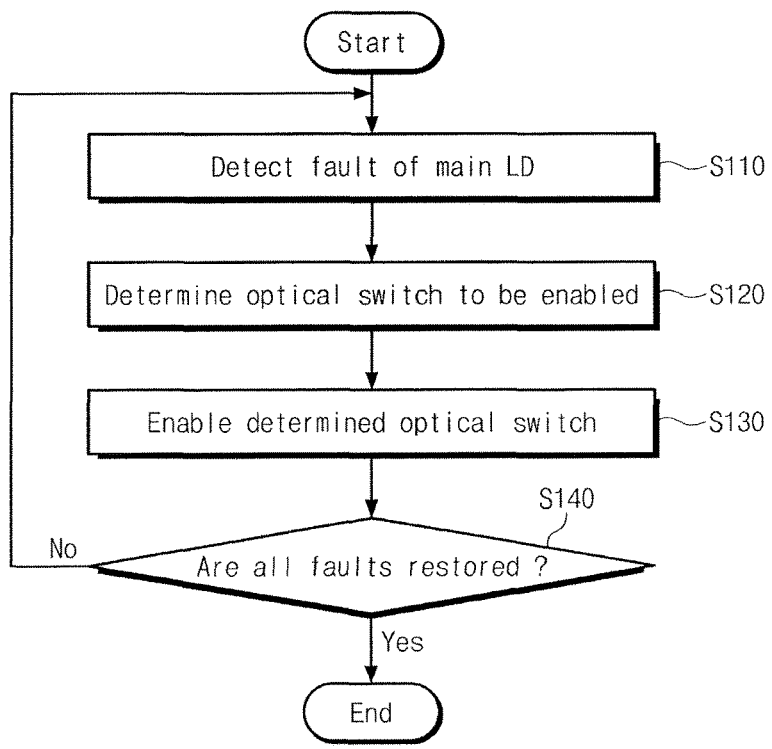
FIG. 17 illustrates an embodiment of an operation of a photonic integrated circuit.

FIG. 17 illustrates an embodiment of a method for operating a photonic integrated circuit, which, for example, may be the photonic integrated circuit 100 of any of FIGS. 1 to 16. For illustrative purposes, the method will be described as operating the photonic integrated circuit 100 of FIG. 1

Referring to FIGS. 1 and 17, in operation S110, the photonic integrated circuit 100 may detect a fault of a main light source MLD. For example, as described with reference to FIGS. 2A and 2B, the transmitter cell TC may include the photo detector PD. When the photo detector PD fails to detect the optical signal SIG normally, it may be determined that the transmitter cell TC or the main light source MLD in the transmitter cell TC is faulty.

In operation S120, the photonic integrated circuit 100 may determine an optical switch to be enabled. For example, as described with reference to FIG. 6, when the transmitter cell TC32 is faulty, the photonic integrated circuit 100 may determine the main optical switch SW32 as an optical switch to be enabled.

In an embodiment, the photonic integrated circuit 100 may determine an optical switch to be enabled such that optical loss is reduced or minimized. For example, in the embodiment described with reference to FIG. 10, when the transmitter cell TC32 and the second redundant light source RLD02 are faulty, the first redundant light source RLD01 may be used to restore the transmitter cell TC32. In this case, a path from the first redundant light source RLD01 to the transmitter cell TC32 may include a first path, in which the redundant optical switches SW01 and SW02 and the main optical switch SW32 are enabled, and a second path in which the redundant optical switches SW08 and SW03 and the main optical switch SW32 are enabled.

In the first path, redundant light from the first redundant light source RLD01 passes through the enabled redundant optical switches SW01 and SW02, the enabled main optical switch SW32, disabled redundant optical switches SW08 and SW03, and disabled main optical switches SW12 and SW22 (e.g., three enabled optical switches and four disabled optical switches).

In the second path, redundant light from the first redundant light source RLD01 passes through the enabled redundant optical switches SW08 and SW03, the enabled main optical switch SW32, and disabled main optical switches SW12 and SW22 (e.g., three enabled optical switches and two disabled optical switches). For example, in the above-described example, when the second path is selected, optical loss may decrease because the number of disabled optical switches through which redundant light passes is relatively small. For example, in the above-described example, like the second path, the photonic integrated circuit 100 may determine the redundant optical switches SW08 and SW03 and the main optical switch SW32 as an optical switch to be enabled.

In an embodiment, as in FIG. 14, when a photonic integrated circuit includes a plurality of redundant optical blocks, the photonic integrated circuit may determine a redundant light source and an optical switch to be used for restoration so that the optical loss is reduced or minimized (or the number of redundant light sources through which a redundant light passes is reduced or minimized).

In operation S130, the photonic integrated circuit 100 may enable the determined optical switch. For example, the controller 130 of the photonic integrated circuit 100 may control a switch signal to be provided to the determined optical switch to allow the determined optical switch to be enabled.

In operation S140, the photonic integrated circuit 100 may determine whether all faults are restored. When it is determined that all faults are not restored (e.g., when a fault not restored exists), the photonic integrated circuit 100 may perform operation S110 to operation S130. When it is determined that all faults are restored, the photonic integrated circuit 100 may end a fault restoration operation. In an embodiment, the above-described fault restoration operation may be performed during driving of the photonic integrated circuit 100, as well as a process of manufacturing the photonic integrated circuit 100.

Figure 18:
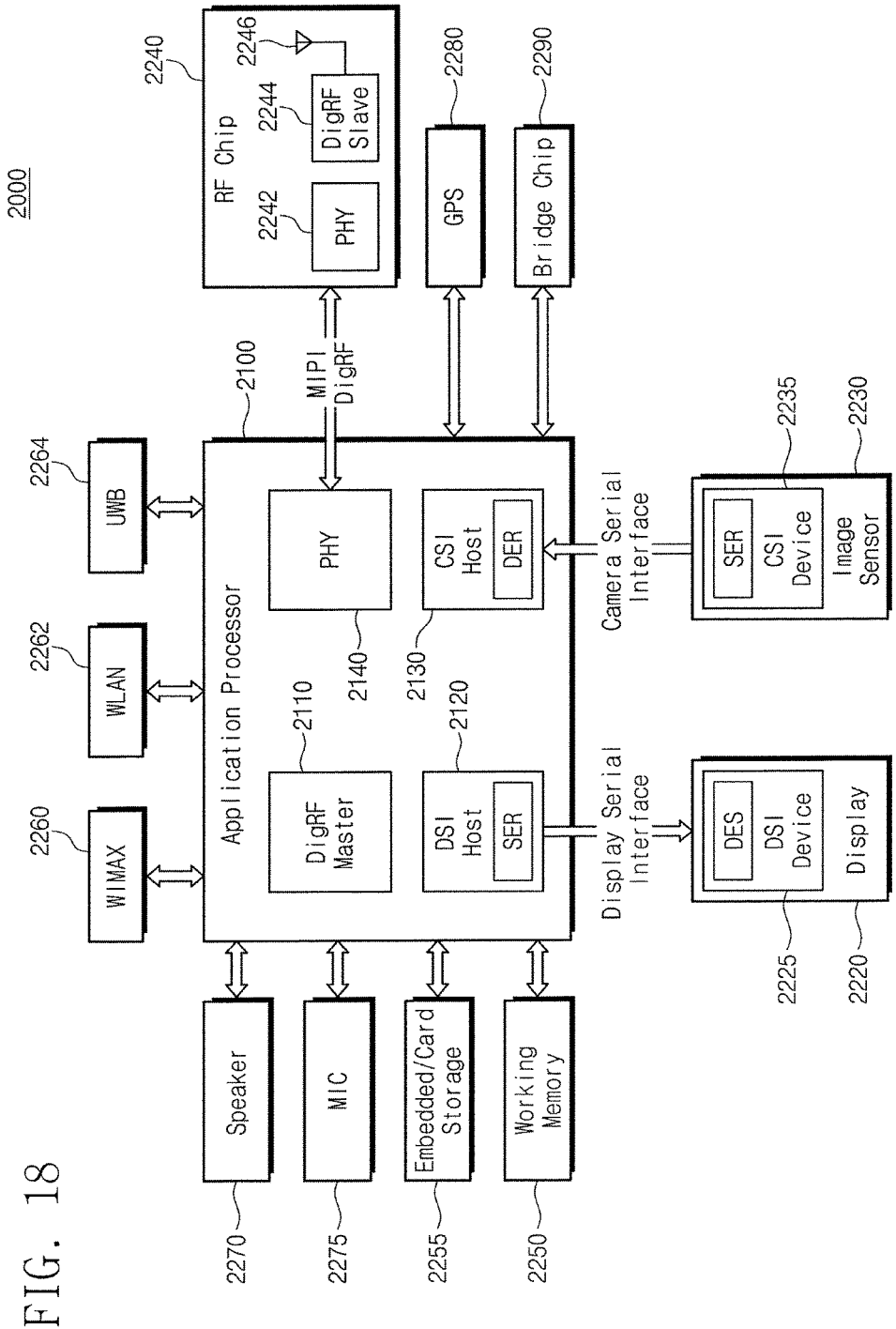
FIG. 18 illustrates an embodiment of an electronic system.

FIG. 18 illustrates an embodiment of an electronic system 2000 to which a photonic integrated circuit is applied. Referring to FIG. 18, the electronic system 2000 may be implemented in the form of a portable communication terminal, a personal digital assistant (PDA), a portable multimedia player (PMP), a smartphone, a wearable device, or in the form of a computing system such as a personal computer, a server, a workstation, or a notebook computer.

The electronic system 2000 may include an application processor 2100 (or a central processing unit), a display 2220, and an image sensor 2230. The application processor 2100 may include a DigRF master 2110, a display serial interface (DSI) host 2120, a camera serial interface (CSI) host 2130, and a physical layer 2140.

The DSI host 2120 may communicate with a DSI device 2225 of the display 2220 through the DSI. In an embodiment, an optical serializer SER may be implemented in the DSI host 2120. For example, an optical deserializer DES may be implemented in the DSI device 2225. The CSI host 2130 may communicate with a CSI device 2235 of the image sensor 2230 through the CSI. In an embodiment, an optical deserializer DES may be implemented in the CSI host 2130. For example, an optical serializer SER may be implemented in the CSI device 2235.

The electronic system 2000 may further include a radio frequency (RF) chip 2240 for communicating with the application processor 2100. The RF chip 2240 may include a physical layer 2242, a DigRF slave 2244, and an antenna 2246. In an embodiment, the physical layer 2242 of the RF chip 2240 and the physical layer 2140 of the application processor 2100 may exchange data with each other through an MIPI DigRF interface.

The electronic system 2000 may further include a working memory 2250 and embedded/card storage 2255. The working memory 2250 and the embedded/card storage 2255 may store data from the application processor 2100. The working memory 2250 and the embedded/card storage 2255 may provide the data stored therein to the application processor 2100.

The working memory 2250 may temporarily store data which was processed or will be processed by the application processor 2100. The working memory 2250 may include a volatile memory, such as a static random access memory (SRAM), a dynamic RAM (DRAM), or a synchronous DRAM (SDRAM), or a nonvolatile memory, such as a flash memory, a phase change RAM (PRAM), a magnetic RAM (MRAM), a resistive RAM (ReRAM), or a ferroelectric RAM (FRAM). The embedded/card storage 2255 may store data regardless of a power supply.

The electronic system 2000 may communicate with an external system through a communication manner such as a worldwide interoperability for microwave access (WiMAX) 2260, a wireless local area network (WLAN) 2262, and an ultra-wideband (UWB) 2264, or the like.

The electronic system 2000 may further include a speaker 2270 and a microphone 2275 for processing voice information. The electronic system 2000 may further include a global positioning system (GPS) device 2280 for processing position information. The electronic system 2000 may further include a bridge chip 2290 for managing connections between peripheral devices.

In an embodiment, each of the components in the electronic system 2000 may include at least one of the photonic integrated circuits described with reference to FIGS. 1 to 16. The components may communicate with each other or may process information based on optical signals using the photonic integrated circuit.

In accordance with one or more of the aforementioned embodiments, a photonic integrated circuit and optical transmitter are provided with improved reliability, at a reduced cost, and with low power consumption.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. A photonic integrated circuit, comprising:
   a first main light source to output a first main light through a first main light input waveguide;
   a first redundant light source to output a first redundant light through a first redundant light transmission waveguide;
   a controller to generate a first switch signal based on a fault state of the first main light source;
   a first optical switch connected between the first redundant light transmission waveguide and a first redundant light input waveguide, the first optical switch to selectively provide the first redundant light from the first redundant light transmission waveguide to the first redundant light input waveguide based on the first switch signal; and
   a first modulator directly connected with the first main light input waveguide and connected with the first redundant light input waveguide, the first modulator to modulate the first main light from the first main light input waveguide or the first redundant light from the first redundant light input waveguide and to output a first optical signal.

2. The photonic integrated circuit as claimed in claim 1, further comprising:
a photo detector to detect the first optical signal.

3. The photonic integrated circuit as claimed in claim 2, wherein:
when the photo detector fails to detect the first optical signal from the first main light source normally, the controller is to generate the first switch signal so that the first optical switch provides the first redundant light to the first redundant light input waveguide.

4. The photonic integrated circuit as claimed in claim 2, wherein:
when the photo detector fails to detect the first optical signal from the first main light source normally, the controller is to interrupt power provided to the first main light source.

5. The photonic integrated circuit as claimed in claim 2, wherein:
when the photo detector detects the first optical signal from the first main light source normally, the controller is to generate the first switch signal so that the first optical switch does not provide the first redundant light to the first redundant light input waveguide.

6. The photonic integrated circuit as claimed in claim 1, further comprising:
a second modulator connected with the first main light input waveguide and the first redundant light input waveguide, the second modulator to modulate the first main light from the first main light input waveguide or the first redundant light from the first redundant light input waveguide and to output a second optical signal.

7. The photonic integrated circuit as claimed in claim 1, further comprising:
a second main light source to output a second main light through a second main light input waveguide;
a second optical switch connected between the first redundant light transmission waveguide and a second redundant light input waveguide, the second optical switch to selectively provide the first redundant light from the first redundant light transmission waveguide to the second redundant light input waveguide based on a second switch signal; and
a second modulator connected with the second main light input waveguide and the second redundant light input waveguide, the second modulator to modulate one of the second main light from the second main light input waveguide or the first redundant light from the second redundant light input waveguide to output a second optical signal, wherein the controller is to generate the second switch signal based on a fault state of the second main light source.

8. The photonic integrated circuit as claimed in claim 7, further comprising:
a third optical switch connected between the first redundant light transmission waveguide and the first redundant light source, wherein the third optical switch is to selectively provide the first redundant light from the first redundant light source to the first redundant light transmission waveguide based on a third switch signal and wherein the controller is to generate the third switch signal based on a fault state of the first main light source or the second main light source.

9. The photonic integrated circuit as claimed in claim 7, further comprising:
a second redundant light source to output a second redundant light through the first redundant light transmission waveguide, the second redundant light having a wavelength different from a wavelength of the first redundant light;
a third optical switch connected between the first redundant light source and the first redundant light transmission waveguide, the third optical switch to operate based on a third switch signal; and
a fourth optical switch connected between the second redundant light source and the first redundant light transmission waveguide, the fourth optical switch to operate based on a fourth switch signal,
wherein the controller is to generate the third and fourth switch signals, wherein center wavelengths of the first and third optical switches, a wavelength of the first main light, and a wavelength of the first redundant light are same, and wherein center wavelengths of the second and fourth optical switches, a wavelength of the second main light, and a wavelength of the second redundant light are same.

10. The photonic integrated circuit as claimed in claim 1, further comprising:
a second main light source to output a second main light through a second main light input waveguide;
a second redundant light source to output a second redundant light through a second redundant light transmission waveguide;
a second optical switch connected between the second redundant light transmission waveguide and a second redundant light input waveguide, the second optical switch to selectively provide the second redundant light from the second redundant light transmission waveguide to the second redundant light input waveguide based on a second switch signal; and
a second modulator connected with the second main light input waveguide and the second redundant light input waveguide, the second modulator to modulate the second main light from the second main light input waveguide or the second redundant light from the second redundant light input waveguide and to output a second optical signal, wherein the controller is to generate the second switch signal based on a fault state of the second main light source.

11. The photonic integrated circuit as claimed in claim 10, further comprising:
a third optical switch connected between the first redundant light transmission waveguide and a redundant light connection waveguide, the third optical switch to operate based on a third switch signal; and
a fourth optical switch connected between the redundant light connection waveguide and the second redundant light transmission waveguide, the fourth optical switch to operate based on a fourth switch signal, wherein the controller is to generate the third and fourth switch signals based on a fault state of each of the first and second redundant light sources.

12. The photonic integrated circuit as claimed in claim 1, wherein the first optical switch includes:
first and second ring resonators connected in series between the first redundant light transmission waveguide and the first redundant light input waveguide; and
first and second tuners to change center frequencies of the first and second ring resonators based on the first switch signal.

13. A photonic integrated circuit, comprising:
a first redundant light source to output a first redundant light through a first redundant light source transmission waveguide;
a plurality of optical transmission cells to respectively generate a plurality of main lights and to respectively modulate the plurality of generated main lights to output a plurality of optical signals;
a plurality of optical switches connected to the first redundant light source transmission waveguide and to provide the first redundant light from the first redundant light source transmission waveguide to each of the plurality of optical transmission cells based on a plurality of switch signals, respectively; and
a controller to generate the plurality of switch signals based on fault states of the plurality of optical transmission cells, respectively,
wherein a faulty optical transmission cell is to modulate the first redundant light instead of a corresponding main light among the plurality of generated main lights to output a corresponding optical signal among the plurality of optical signals.

14. The photonic integrated circuit as claimed in claim 13, wherein: when any one of the plurality of optical transmission cells is faulty, the controller is to generate the plurality of switch signals so that the plurality of optical switches provide the first redundant light to the faulty optical transmission cell.

15. The photonic integrated circuit as claimed in claim 13, wherein each of the plurality of optical transmission cells includes:
a main light source to generate the corresponding one of the plurality of main lights;
a modulator to modulate the corresponding main light to generate the corresponding one of the plurality of optical signals; and
a photo detector to detect the corresponding optical signal.

16. The photonic integrated circuit as claimed in claim 13, further comprising a redundant optical switch between the first redundant light source and the plurality of optical switches.

17. An optical transmitter, comprising:
a first modulator to output a first optical signal;
a first main light source directly connected with the first modulator through a first main light input waveguide, the first main light source to output a first main light through the first main light input waveguide; and
a first optical switch connected with the first modulator through a first redundant light input waveguide, the first optical switch to selectively provide a first redundant light from outside the optical transmitter to the first redundant light input waveguide depending on a fault state of the first main light source,
wherein the first modulator is to modulate the first main light to output the first optical signal and wherein, when the first main light source is faulty, the first modulator is to modulate the first redundant light from the first redundant light input waveguide to output the first optical signal.

18. The optical transmitter as claimed in claim 17, further comprising:
a photo detector to detect the first optical signal,
wherein the photo detector is to provide a detection result to an external device.

19. The optical transmitter as claimed in claim 17, further comprising:
a second modulator to output a second optical signal;
a second main light source connected with the second modulator through a second main light input waveguide, the second main light source to output a second main light through the second main light input waveguide; and
a second optical switch connected with the second modulator through a second redundant light input waveguide, the second optical switch to selectively provide the first redundant light from outside the optical transmitter to the second redundant light input waveguide depending on a fault state of the second main light source,
wherein the second modulator is to modulate the second main light to output the second optical signal and wherein, when the second main light source is faulty, the second modulator is to modulate the first redundant light from the second redundant light input waveguide to output the second optical signal.

20. The optical transmitter as claimed in claim 17, further comprising:
a second modulator connected with the first main light input waveguide and the first redundant light input waveguide, the second modulator to modulate the first main light to output a second optical signal, wherein, when the first main light source is faulty, the second modulator is to modulate the first redundant light from the first redundant light input waveguide to output the second optical signal.

* * * * *